US012647948B2

(12) United States Patent
Lin

(10) Patent No.: US 12,647,948 B2
(45) Date of Patent: Jun. 2, 2026

(54) METHOD AND APPARATUS FOR UPLINK TIMING DETERMINATION IN A WIRELESS COMMUNICATION SYSTEM

(71) Applicant: ASUSTek Computer Inc., Taipei City (TW)

(72) Inventor: Ko-Chiang Lin, Taipei City (TW)

(73) Assignee: ASUSTek Computer Inc., Taipei City (TW)

( * ) Notice: Subject to any disclaimer, the term of this patent is extended or adjusted under 35 U.S.C. 154(b) by 17 days.

(21) Appl. No.: 17/096,124

(22) Filed: Nov. 12, 2020

(65) Prior Publication Data

US 2021/0153193 A1 May 20, 2021

Related U.S. Application Data

(60) Provisional application No. 62/935,209, filed on Nov. 14, 2019.

(51) Int. Cl.
*H04W 72/0446* (2023.01)
*G04R 20/02* (2013.01)
*H04W 56/00* (2009.01)
*H04W 72/542* (2023.01)

(52) U.S. Cl.
CPC ........ *H04W 72/0446* (2013.01); *G04R 20/02* (2013.01); *H04W 56/0015* (2013.01); *H04W 56/005* (2013.01); *H04W 56/0055* (2013.01); *H04W 72/542* (2023.01)

(58) Field of Classification Search
CPC ........... H04W 72/0446; H04W 72/085; H04W 56/0015; H04W 56/0065; H04W 56/0045;

H04W 72/1268; H04W 56/0005; H04W 56/0055; H04W 72/542; H04W 56/005; H04W 72/231; G04R 20/02
See application file for complete search history.

(56) References Cited

U.S. PATENT DOCUMENTS

| | | | | |
|---|---|---|---|---|
| 6,188,351 | B1 * | 2/2001 | Bloebaum | G01S 19/258 |
| | | | | 342/357.42 |
| 6,252,543 | B1 * | 6/2001 | Camp | G01S 19/46 |
| | | | | 455/457 |
| 9,119,021 | B2 * | 8/2015 | Bucknell | H04W 72/121 |
| 10,581,544 | B2 | 3/2020 | Blasco Serrano et al. | |
| 11,515,937 | B2 * | 11/2022 | Nuttall | H04B 7/18586 |

(Continued)

FOREIGN PATENT DOCUMENTS

| | | |
|---|---|---|
| CN | 107950065 A | 4/2018 |
| CN | 110278612 A | 9/2019 |

(Continued)

OTHER PUBLICATIONS

European Search Report in corresponding EP Application No. 20207072.8, dated Apr. 23, 2021.

(Continued)

*Primary Examiner* — Ivan O Latorre
(74) *Attorney, Agent, or Firm* — Skaar Ulbrich Macari, P.A.

(57) ABSTRACT

A method and apparatus are disclosed from the perspective of a User Equipment (UE). In one embodiment, the UE performs an Uplink (UL) transmission of an UL signal to a base station in an UL subframe wherein the UL subframe begins at a timing derived based on an absolute time.

17 Claims, 13 Drawing Sheets

(56) References Cited

U.S. PATENT DOCUMENTS

| | | | | |
|---|---|---|---|---|
| 2002/0107031 A1* | 8/2002 | Syrjarinne | G01S 19/23 | 455/456.1 |
| 2004/0080454 A1* | 4/2004 | Camp, Jr. | G01S 5/0236 | 342/464 |
| 2004/0147269 A1* | 7/2004 | Kim | G01S 5/0221 | 455/456.2 |
| 2007/0115113 A1* | 5/2007 | Wang | G08G 1/052 | 340/936 |
| 2009/0245227 A1* | 10/2009 | Chin | H04B 7/2681 | 370/350 |
| 2009/0292990 A1* | 11/2009 | Park | G06F 3/0485 | 715/830 |
| 2010/0019959 A1* | 1/2010 | Tomita | G01S 19/25 | 342/357.395 |
| 2010/0238070 A1* | 9/2010 | Harper | G01S 19/12 | 342/357.46 |
| 2012/0209519 A1* | 8/2012 | Basnayake | G01S 19/258 | 701/457 |
| 2013/0122929 A1* | 5/2013 | Al-Mufti | H04W 64/003 | 455/456.1 |
| 2013/0286957 A1 | 10/2013 | Bucknell et al. | | |
| 2018/0124724 A1* | 5/2018 | Tsai | H04W 74/0833 | |
| 2018/0188698 A1* | 7/2018 | Dionne | G04R 20/04 | |
| 2019/0090293 A1* | 3/2019 | Su | H04W 76/14 | |
| 2019/0239172 A1 | 8/2019 | Hampel et al. | | |
| 2020/0204319 A1 | 6/2020 | Dinan | | |
| 2021/0345344 A1* | 11/2021 | Sha | H04W 72/53 | |
| 2022/0116975 A1* | 4/2022 | Yang | H04W 72/1284 | |

FOREIGN PATENT DOCUMENTS

| | | | | |
|---|---|---|---|---|
| EP | 3297343 | 3/2018 | | |
| ES | 2648689 T3 * | 1/2018 | ........ | H04W 36/0072 |
| WO | 2017204702 | 11/2017 | | |
| WO | 2018021824 A1 | 2/2018 | | |
| WO | 2020168332 | 8/2020 | | |

OTHER PUBLICATIONS

CATT: "Discussion on Timing Advance Measurement for Positioning", 3GPP Draft; R4-092859, Discussion of Timing Advance Measurement for Positioning, 3rd Generation Partnership Project (3GPP), Mobile Competence Centre; 650, Route des Lucioles; F-06921, Sophia-Antipolis Cedex; France, no. Shenzhen, China; Aug. 18, 2009, Aug. 18, 2009, XP050354026.

Notice of Submission of Opinion in corresponding KR Application No. 10-2020-0150968, dated Jan. 30, 2022.

Office Action to the corresponding Chinese Patent Application rendered by the State Intellectual Property Office (SIPO) on Jan. 12, 2024, 10 pages.

Zhang et al.; "Power Grid Time Synchronization Method Based on TD-LTE Frame Synchronization"; Feb. 2017; 7 pages.

ZTE Corporation; R2-1814376; "Support for UL Transmission Over Preconfigured Dedicated Resource in Idle Mode for NB-IoT and eMTC"; Sep. 28, 2018; 7 pages.

* cited by examiner

| $\mu$ | $\Delta f = 2^{\mu} \cdot 15 \, [\mathrm{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Downlink frame $i$

Uplink frame $i$ $$\left( N_{TA} + N_{TA,offset} \right) T_c$$

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 7 (PRIOR ART)

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 8 (PRIOR ART)

| Transition time | FR1 | FR2 |
|---|---|---|
| $N_{Tx-Rx}$ | 25600 | 13792 |
| $N_{Rx-Tx}$ | 25600 | 13792 |

FIG. 9 (PRIOR ART)

| PRACH configuration period (msec) | Association period (number of PRACH configuration periods) |
|---|---|
| 10 | {1, 2, 4, 8, 16} |
| 20 | {1, 2, 4, 8} |
| 40 | {1, 2, 4} |
| 80 | {1, 2} |
| 160 | {1} |

FIG. 10 (PRIOR ART)

| Preamble SCS | $N_{gap}$ |
|---|---|
| 1.25 kHz or 5 kHz | 0 |
| 15 kHz or 30 kHz or 60 kHz or 120 kHz | 2 |

FIG. 11 (PRIOR ART)

| RAR grant field | Number of bits |
|---|---|
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |

FIG. 12 (PRIOR ART)

| TPC Command | Value (in dB) |
|:---:|:---:|
| 0 | -6 |
| 1 | -4 |
| 2 | -2 |
| 3 | 0 |
| 4 | 2 |
| 5 | 4 |
| 6 | 6 |
| 7 | 8 |

FIG. 13 (PRIOR ART)

| Number of PRBs in initial UL BWP | Value of $N_{UL,hop}$ Hopping Bits | Frequency offset for 2nd hop |
|:---:|:---:|:---:|
| $N_{BWP}^{size} < 50$ | 0 | $\lfloor N_{BWP}^{size}/2 \rfloor$ |
| | 1 | $\lfloor N_{BWP}^{size}/4 \rfloor$ |
| $N_{BWP}^{size} \geq 50$ | 00 | $\lfloor N_{BWP}^{size}/2 \rfloor$ |
| | 01 | $\lfloor N_{BWP}^{size}/4 \rfloor$ |
| | 10 | $-\lfloor N_{BWP}^{size}/4 \rfloor$ |
| | 11 | Reserved |

FIG. 14 (PRIOR ART)

| Platforms | Altitude range | Orbit | Typical beam footprint size |
|---|---|---|---|
| Low-Earth Orbit (LEO) satellite | 300 – 1500 km | Circular around the earth | 100 – 500 km |
| Medium-Earth Orbit (MEO) satellite | 7000 – 25000 km | | 100 – 500 km |
| Geostationary Earth Orbit (GEO) satellite | 35 786 km | notional station keeping position fixed in terms of elevation/azimuth with respect to a given earth point | 200 – 1000 km |
| UAS platform (including HAPS) | 8 – 50 km (20 km for HAPS) | | 5 - 200 km |
| High Elliptical Orbit (HEO) satellite | 400 – 50000 km | Elliptical around the earth | 200 – 1000 km |

FIG. 19 (PRIOR ART)

METHOD AND APPARATUS FOR UPLINK TIMING DETERMINATION IN A WIRELESS COMMUNICATION SYSTEM

CROSS-REFERENCE TO RELATED APPLICATIONS

The present Application claims the benefit of U.S. Provisional Patent Application Ser. No. 62/935,209 filed on Nov. 14, 2019, the entire disclosure of which is incorporated herein in their entirety by reference.

FIELD

This disclosure generally relates to wireless communication networks, and more particularly, to a method and apparatus for uplink determination in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a User Equipment (UE). In one embodiment, the UE performs an Uplink (UL) transmission of an UL signal to a base station in an UL subframe wherein the UL subframe begins at a timing derived based on an absolute time.

BRIEF DESCRIPTION OF THE DRAWINGS

FIG. 7 is a reproduction of Table 4.3.2-1 of 3GPP TS 38.211 V15.7.0

FIG. 8 is a reproduction of Table 4.3.2-2 of 3GPP TS 38.211 V15.7.0

FIG. 9 is a reproduction of Table 4.3.2-3 of 3GPP TS 38.211 V15.7.0.

FIG. 10 is a reproduction of Table 8.1-1 of 3GPP TS 38.321 V15.7.0.

FIG. 11 is a reproduction of Table 8.1-2 of 3GPP TS 38.321 V15.7.0.

FIG. 12 is a reproduction of Table 8.2-1 of 3GPP TS 38.321 V15.7.0.

FIG. 13 is a reproduction of Table 8.2-2 of 3GPP TS 38.321 V15.7.0.

FIG. 14 is a reproduction of Table 8.3-1 of 3GPP TS 38.321 V15.7.0.

FIG. 19 is a reproduction of Table 4.1-1 of 3GPP TS 38.821 V0.7.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.211 V15.7.0 (2019 September), "NR; Physical channels and modulation (Release 15)"; TS 38.214 V15.7.0 (2019 September), "NR; Physical layer procedures for data (Release 15)"; TS 38.321 V15.7.0 (2019 September), "NR; Medium Access Control (MAC) protocol specification (Release 15)"; TS 38.213 V15.7.0 (2019 September), "NR; Physical layer procedures for control (Release 15)"; TS 38.821 V0.7.0 (2019 May), "Solutions for NR to support non-terrestrial networks (NTN) (Release 16)"; R1-1911249, "Final Report of 3GPP TSG RAN WG1 #98 V2.0.0 (Prague, Czech Rep, 26th-30th August 2019)"; and R1-1913275, "Final Report of 3GPP TSG RAN WG1 #98bis V2.0.0 (Chongqing, China, 14-20 Oc. 2019)". The standards and documents listed above are hereby expressly incorporated by reference in their entirety.

Figure 1:
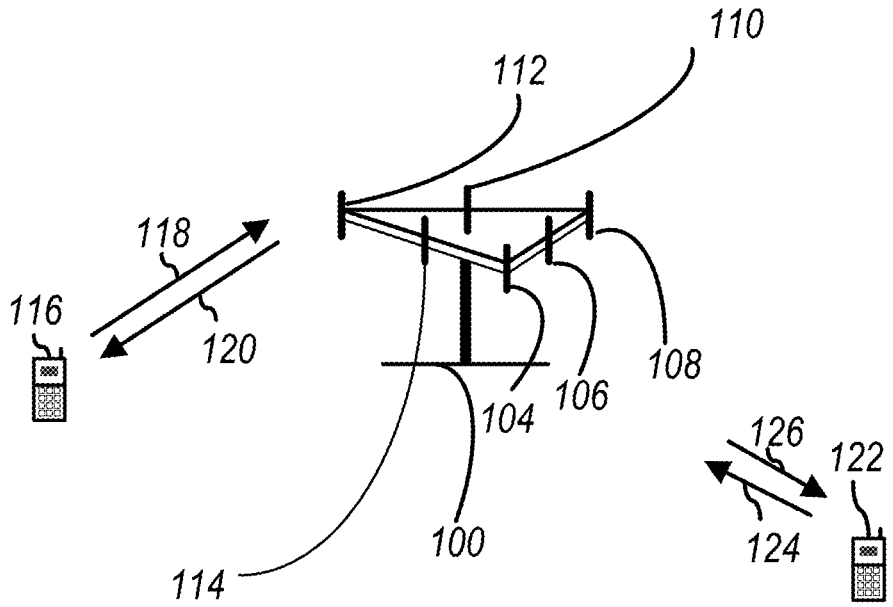
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group.

Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
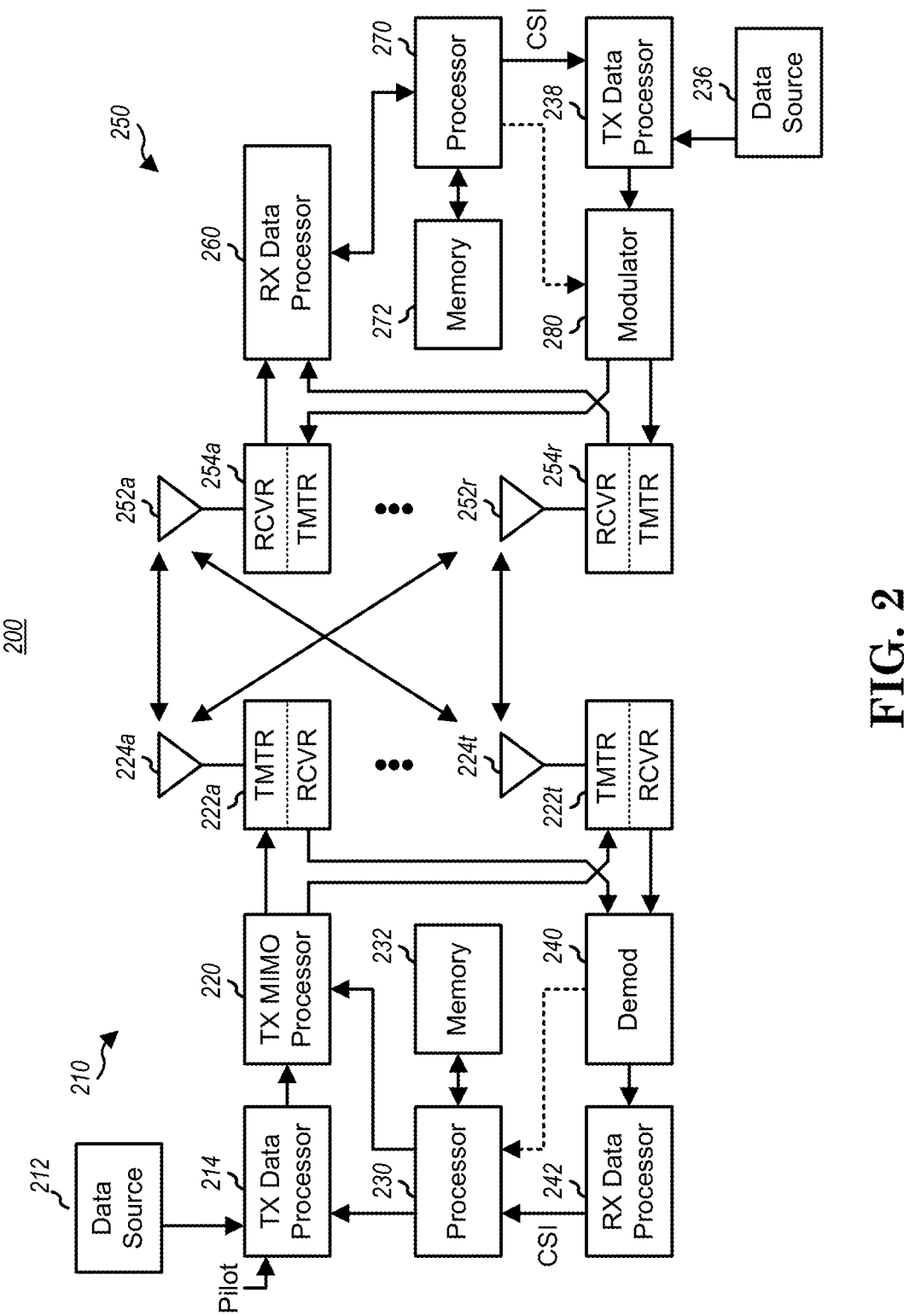
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides Nr modulation symbol streams to Nr transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Nr modulated signals from transmitters 222a through 222t are then transmitted from Nr antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide Nr "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
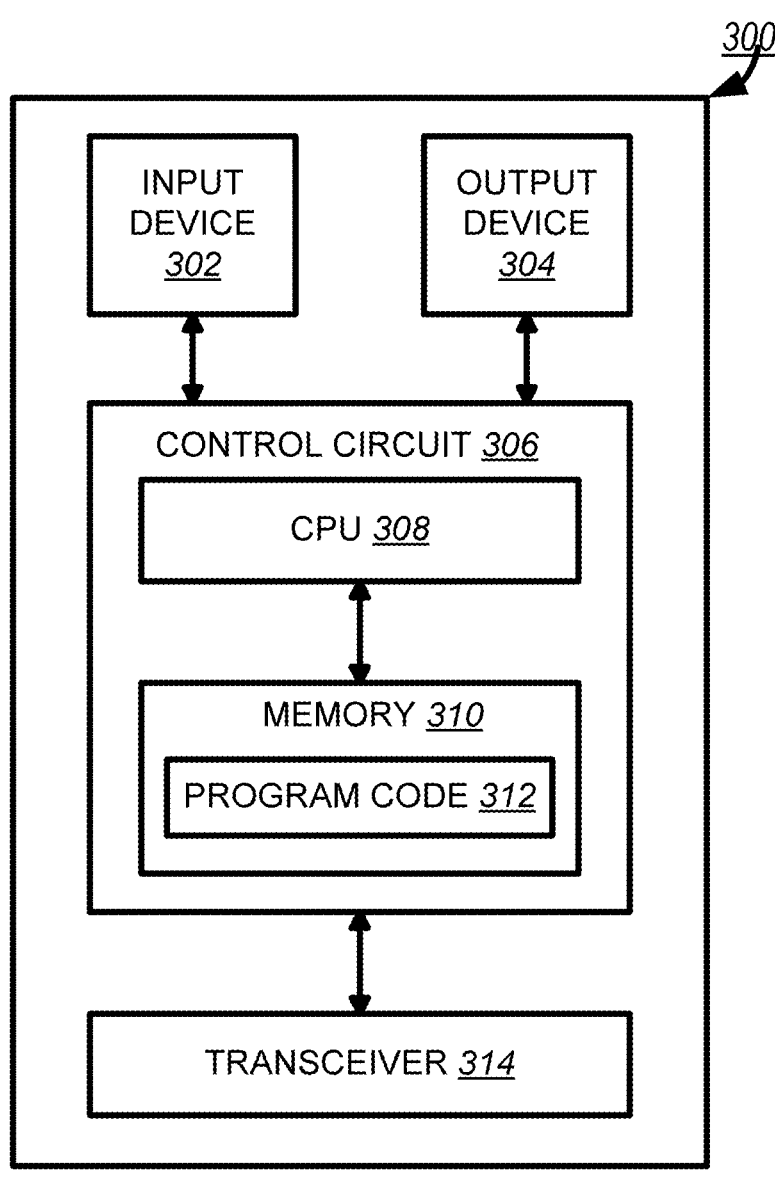
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
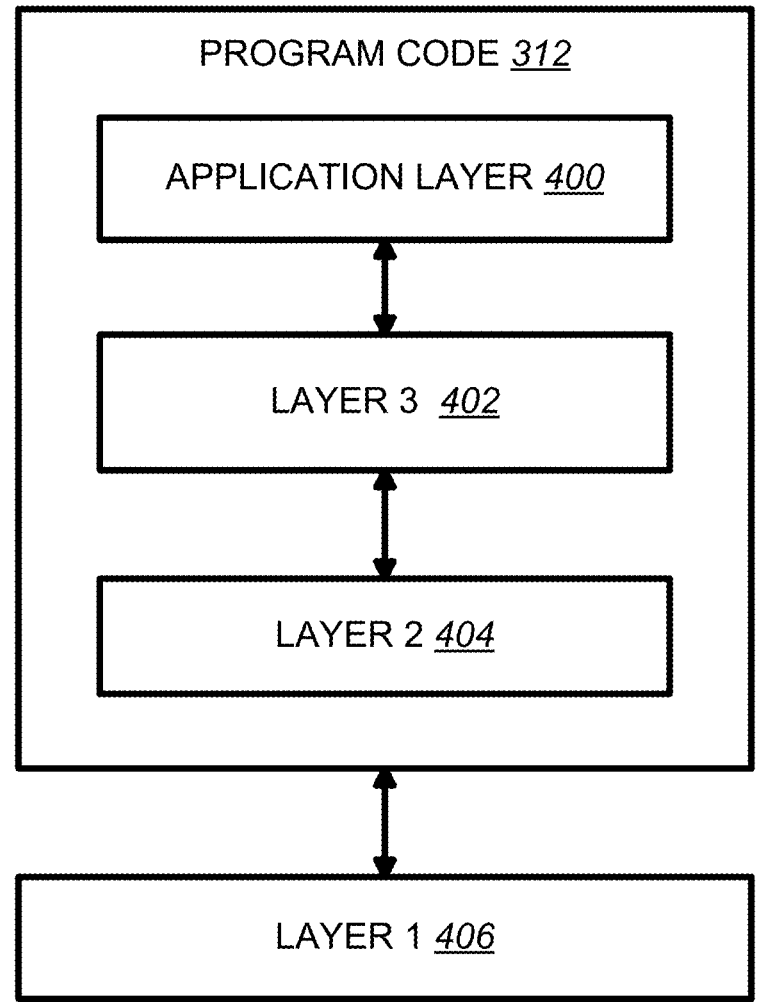
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Frame structure used in New RAT (NR) for 5G, to accommodate various type of requirement [1] (as discussed in 3GPP TS 38.211) for time and frequency resource, e.g. from ultra-low latency (~0.5 ms) to delay-tolerant traffic for MTC, from high peak rate for eMBB to very low data rate for MTC. An important focus of this study is low latency aspect, e.g. short TTI, while other aspect of mixing or adapting different TTIs can also be considered in the study. In addition to diverse services and requirements, forward compatibility is an important consideration in initial NR frame structure design as not all features of NR would be included in the beginning phase or release.

Reducing latency of protocol is an important improvement between different generations or releases, which can improve efficiency as well as meeting new application requirements, e.g. real-time service. An effective method frequently adopted to reduce latency is to reduce the length of TTIs, from 10 ms in 3G to 1 ms in LTE.

When it comes to NR, the story becomes somehow different, as backward compatibility is not a must. Numerology can be adjusted so that reducing symbol number of a TTI would not be the only tool to change TTI length. Using LTE numerology as an example, it comprises 14 OFDM symbol in 1 ms and a subcarrier spacing of 15 KHz. When the subcarrier spacing goes to 30 KHz, under the assumption of same FFT size and same CP structure, there would be 28 OFDM symbols in 1 ms, equivalently the TTI become 0.5 ms if the number of OFDM symbol in a TTI is kept the same. This implies the design between different TTI lengths can be kept common, with good scalability performed on the subcarrier spacing. Of course there would always be trade-off for the subcarrier spacing selection, e.g. FFT size, definition or number of PRB, the design of CP, supportable system bandwidth, etc. . . . . While as NR considers larger system bandwidth, and larger coherence bandwidth, inclusion of a larger sub carrier spacing is a nature choice.

As discussed above, it is very difficult to fulfill all diverse requirements with a single numerology. Therefore, it is agreed in the very first meeting that more than one numerologies would be adopted. And considering the standardization effort, implementation efforts, as well as multiplexing capability among different numerologies, it would be beneficial to have some relationship between different numerologies, such as integral multiple relationship. Several numerology families, were raised, one of them is based on LTE 15 KHz, and some other numerologies (Alt2~4 below) which allows power N of 2 symbols in 1 ms:

For NR, it is necessary to support more than one values of subcarrier-spacing

Values of subcarrier-spacing are derived from a particular value of subcarrier-spacing multiplied by N where N is an integer Alt.1: Subcarrier-spacing values include 15 kHz subcarrier-spacing (i.e., LTE based numerology)

Alt.2: Subcarrier-spacing values include 17.5 kHz subcarrier-spacing with uniform symbol duration including CP length Alt.3: Subcarrier-spacing values include 17.06 kHz subcarrier-spacing with uniform symbol duration including CP length Alt.4: Subcarrier-spacing values 21.33 kHz Note: other alternatives are not precluded FFS: exact value of a particular value and possible values of N The values of possible subcarrier-spacing will be further narrowed-down in RAN1 #85

Usually, RAN1 works as band agnostic manner, i.e. a scheme or feature would be assumed to be applicable for all frequency bands and in the following RAN4 would derive relevant test case considering if some combination is unrealistic or deployment can be done reasonably. This rule would still be assumed in NR, while some companies do see there would be restriction for sure as the frequency range of NR is quite high:

For the study of NR, RAN1 assumes that multiple (but not necessarily all) OFDM numerologies can apply to the same frequency range Note: RAN1 does not assume to apply very low value of subcarrier spacing to very high carrier frequency 3GPP TS 38.211 provides the following additional details of NR frame structure, channel and numerology design:

4 Frame Structure and Physical Resources

4.1 General

Throughout this specification, unless otherwise noted, the size of various fields in the time domain is expressed in time units $T_c=1/(\Delta f_{max} \cdot N_f)$ where $\Delta f_{max}=480 \cdot 10^3$ Hz and $N_f=4096$. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$.

4.2 Numerologies

Multiple OFDM numerologies are supported as given by Table 4.2-1 where $\mu$ and the cyclic prefix for a bandwidth part are obtained from the higher-layer parameter subcarrierSpacing and cyclicPrefix, respectively.

Figures 5, 6:
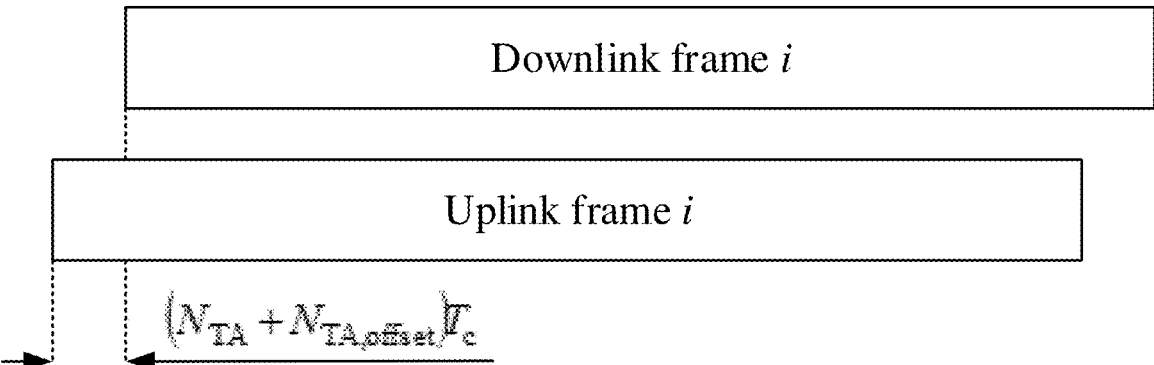
FIG. 5 is a reproduction of Table 4.2-1 of 3GPP TS 38.211 V15.7.0.
FIG. 6 is a reproduction of FIG. 4.3.1-1 of 3GPP TS 38.211 V15.7.0.

[Table 4.2-1 of 3GPP TS 38.211 V15.7.0, Entitled "Supported Transmission Numerologies", is Reproduced as FIG. 5]

4.3 Frame Structure

4.3.1 Frames and Subframes

Downlink and uplink transmissions are organized into frames with $T_f=(\Delta f_{max} \, N_f/100) \cdot T_c=10$ ms duration, each consisting of ten subframes of $Tsf=(\Delta f_{max} N_f/1000) \cdot T_c=1$ ms duration. The number of consecutive OFDM symbols per subframe is $$N_{symb}^{subframe,\mu} = N_{symb}^{slot} N_{slot}^{subframe,\mu}.$$

Each frame is divided into two equally-sized half-frames of five subframes each with half-frame 0 consisting of subframes 0-4 and half-frame 1 consisting of subframes 5-9.

There is one set of frames in the uplink and one set of frames in the downlink on a carrier. Uplink frame number i for transmission from the UE shall start $T_{TA}=(N_{TA}+N_{TA,offset})$ $T_c$ before the start of the corresponding downlink frame at the UE where $N_{TA,offset}$ is given by [5, TS 38.213].

7

[FIG. 4.3.1-1 of 3GPP TS 38.211 V15.7.0, Entitled "Uplink-Downlink Timing Relation", is Reproduced as FIG. 6]

4.3.2 Slots

For subcarrier spacing configuration μ, slots are numbered $$n_s^\mu \in \left\{0, \ldots, N_{slot}^{subframe,\mu} - 1\right\}$$

in increasing order within a subframe and $$n_{s,f}^\mu \in \left\{0, \ldots, N_{slot}^{frame,\mu} - 1\right\}$$

in increasing order within a frame. There are $$N_{symb}^{slot}$$

consecutive OFDM symbols in a slot where $$N_{symb}^{slot}$$

depends on the cyclic prefix as given by Tables 4.3.2-1 and 4.3.2-2. The start of slot $$n_s^\mu$$

in a subframe is aligned in time with the start of OFDM symbol $$n_s^\mu N_{symb}^{slot}$$

in the same subframe.

OFDM symbols in a slot can be classified as 'downlink', 'flexible', or 'uplink'. Signaling of slot formats is described in subclause 11.1 of [5, TS 38.213].

In a slot in a downlink frame, the UE shall assume that downlink transmissions only occur in 'downlink' or 'flexible' symbols.

In a slot in an uplink frame, the UE shall only transmit in 'uplink' or 'flexible' symbols. A UE not capable of full-duplex communication and not supporting simultaneous transmission and reception as defined by parameter simultaneousRxTxInterBandENDC, simultaneousRxTxInterBandCA or simultaneousRxTxSUL [10, TS 38.306] among all cells within a group of cells is not expected to transmit in the uplink in one cell within the group of cells earlier than $N_{Rx-Tx}T_c$, after the end of the last received downlink symbol in the same or different cell within the group of cells where $N_{Rx-Tx}$ is given by Table 4.3.2-3.

A UE not capable of full-duplex communication and not supporting simultaneous transmission and reception as defined by parameter simultaneousRxTxInterBandENDC, simultaneousRxTxInterBandCA or simultaneousRxTxSUL [10, TS 38.306] among all cells within a group of cells is not expected to receive in the downlink in one cell within the group of cells earlier than $N_{Tx-Rx}T_c$ after the end of the last transmitted uplink symbol in the same or different cell within the group of cells where $N_{Tx-Rx}$ is given by Table 4.3.2-3.

A UE not capable of full-duplex communication is not expected to transmit in the uplink earlier than $N_{Rx-Tx}T_c$ after the end of the last received downlink symbol in the same cell where $N_{Rx-Tx}$ is given by Table 4.3.2-3.

A UE not capable of full-duplex communication is not expected to receive in the downlink earlier than $N_{Tx-Rx}T_c$ after the end of the last transmitted uplink symbol in the same cell where $N_{Tx-Rx}$ is given by Table 4.3.2-3.

[Table 4.3.2-1 of 3GPP TS 38.211 V15.7.0, Entitled "Number of OFDM Symbols Per Slot, Slots Per Frame, and Slots Per Subframe for Normal Cyclic Prefix", is Reproduced as FIG. 7]

[Table 4.3.2-2 of 3GPP TS 38.211 V15.7.0, Entitled "Number of OFDM Symbols Per Slot, Slots Per Frame, and Slots Per Subframe for Extended Cyclic Prefix", is Reproduced as FIG. 8]

[Table 4.3.2-3 of 3GPP TS 38.211 V15.7.0, Entitled "Transition Time $N_{Rx-Tx}$ and $N_{Tx-Rx}$", IS Reproduced as FIG. 9]

4.4 Physical Resources 4.4.1 Antenna Ports

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same PRG as described in clause 5.1.2.3 of [6, TS 38.214].

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used as described in clause 7.3.2.2.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index according to clause 7.4.3.1.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

4.4.2 Resource Grid

For each numerology and carrier, a resource grid of $$N_{grid,x}^{size,\mu} N_{sc}^{RB}$$

subcarriers anu $$N_{symb}^{subframe,\mu}$$

OFDM symbols is defined, starting at common resource block $$N_{grid}^{start,\mu}$$

indicated by higher-layer signalling. There is one set of resource grids per transmission direction (uplink or downlink) with the subscript x set to DL and UL for downlink and uplink, respectively. When there is no risk for confusion, the subscript x may be dropped. There is one resource grid for a given antenna port p, subcarrier spacing configuration $\mu$, and transmission direction (downlink or uplink).

The carrier bandwidth $$N_{grid}^{size,\mu}$$

for subcarrier spacing configuration $\mu$ is given by the higher-layer parameter carrierBandwidth in the SCS-SpecificCarrier IE. The starting position $$N_{grid}^{start,\mu}$$

for subcarrier spacing configuration u is given by the higher-layer parameter offsetToCarrier in the SCS-SpecificCarrier IE.

The frequency location of a subcarrier refers to the center frequency of that subcarrier.

For the downlink, the higher-layer parameter txDirectCurrentLocation in the SCS-SpecificCarrier IE indicates the location of the transmitter DC subcarrier in the downlink for each of the numerologies configured in the downlink. Values in the range 0-3299 represent the number of the DC subcarrier and the value 3300 indicates that the DC subcarrier is located outside the resource grid.

For the uplink, the higher-layer parameter txDirectCurrentLocation in the UplinkTxDirectCurrentBWP IE indicates the location of the transmitter DC subcarrier in the uplink for each of the configured bandwidth parts, including whether the DC subcarrier location is offset by 7.5 kHz relative to the center of the indicated subcarrier or not. Values in the range 0-3299 represent the number of the DC subcarrier, the value 3300 indicates that the DC subcarrier is located outside the resource grid, and the value 3301 indicates that the position of the DC subcarrier in the uplink is undetermined.

4.4.3 Resource Elements

Each element in the resource grid for antenna port p and subcarrier spacing configuration u is called a resource element and is uniquely identified by $(k, l)_{p,\mu}$ where k is the index in the frequency domain and l refers to the symbol position in the time domain relative to some reference point. Resource element $(k, l)_{p,\mu}$ corresponds to a physical resource and the complex value $$a_{k,l}^{(p,\mu)}.$$

When there no risk for confusion, or no particular antenna port or subcarrier spacing is specified, the indices p and $\mu$ may be dropped, resulting in $$a_{k,l}^{(p)}$$

or $a_{k,l}$.

4.4.4 Resource Blocks 4.4.4.1 General

A resource block is defined as $$N_{sc}^{RB} = 12$$

consecutive subcarriers in the frequency domain.

4.4.4.2 Point A

Point A serves as a common reference point for resource block grids and is obtained from:

offsetToPointA for a PCell downlink where offsetToPointA represents the frequency offset between point A and the lowest subcarrier of the lowest resource block, which has the subcarrier spacing provided by the higher-layer parameter subCarrierSpacingCommon and overlaps with the SS/PBCH block used by the UE for initial cell selection, expressed in units of resource blocks assuming 15 kHz subcarrier spacing for FR1 and 60 kHz subcarrier spacing for FR2;

absoluteFrequencyPointA for all other cases where absoluteFrequencyPointA represents the frequency-location of point A expressed as in ARFCN.

4.4.4.3 Common Resource Blocks

Common resource blocks are numbered from 0 and upwards in the frequency domain for subcarrier spacing configuration $\mu$. The center of subcarrier 0 of common resource block 0 for subcarrier spacing configuration $\mu$ coincides with 'point A'.

The relation between the common resource block number $$n_{CRB}^{\mu}$$

in the frequency domain and resource elements (k,l) for subcarrier spacing configuration $\mu$ is given by $$n_{CRB}^{\mu} = \left\lfloor \frac{k}{N_{sc}^{RB}} \right\rfloor$$

where k is defined relative to point A such that k=0 corresponds to the subcarrier centered around point A.

4.4.4.4 Physical Resource Blocks

Physical resource blocks for subcarrier configuration $\mu$ are defined within a bandwidth part and numbered from 0 to $$N_{BWP,i}^{size,\mu} - 1$$

where i is the number of the bandwidth part. The relation between the physical resource block $$n_{PRB}^{\mu}$$

in bandwidth part i and the common resource block $$n_{CRB}^{\mu}$$

is given by $$n_{CRB}^{\mu} = n_{PRB}^{\mu} + N_{BWP,i}^{start,\mu}$$

where $$N_{BWP,i}^{start,\mu}$$

is the common resource block where bandwidth part starts relative to common resource block 0. When there is no risk for confusion the index u may be dropped.

4.4.4.5 Virtual Resource Blocks

Virtual resource blocks are defined within a bandwidth part and numbered from 0 to $$N_{BWP,i}^{size} - 1$$

where i is the number of the bandwidth part.

4.4.5 Bandwidth Part

A bandwidth part is a subset of contiguous common resource blocks defined in subclause 4.4.4.3 for a given numerology $\mu_i$ in bandwidth part i on a given carrier. The starting position $$N_{BWP,i}^{start,\mu}$$

and the number of resource blocks $$N_{BWP,i}^{size,\mu}$$

in a bandwidth part shall fulfill $$N_{grid,x}^{start,\mu} \le N_{BWP,i}^{start,\mu} < N_{grid,x}^{start,\mu} + N_{grid,x}^{size,\mu} \text{ and } N_{grid,x}^{start,\mu} <$$

$$N_{BWP,i}^{start,\mu} + N_{BWP,i}^{size,\mu} \le N_{grid,x}^{start,\mu} + N_{grid,x}^{size,\mu},$$

respectively. Configuration of a bandwidth part is described in clause 12 of [5, TS 38.213].

A UE can be configured with up to four bandwidth parts in the downlink with a single downlink bandwidth part being active at a given time. The UE is not expected to receive PDSCH, PDCCH, or CSI-RS (except for RRM) outside an active bandwidth part.

A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE shall not transmit PUSCH or PUCCH outside an active bandwidth part. For an active cell, the UE shall not transmit SRS outside an active bandwidth part.

Unless otherwise noted, the description in this specification applies to each of the bandwidth parts. When there is no risk of confusion, the index u may be dropped from $$N_{BWP,i}^{start,\mu}, N_{BWP,i}^{size,\mu}, N_{grid,x}^{start,\mu}, \text{ and } N_{grid,x}^{size,\mu}.$$

4.5 Carrier Aggregation

Transmissions in multiple cells can be aggregated. Unless otherwise noted, the description in this specification applies to each of the serving cells.

In conventional cellular system, UL timing advance (TA) needs to be obtained to ensure a UE transmit UL signal(s) at proper timing. TA is a timing difference between UL transmission timing and DL reception timing at UE side. For example, TA is a time duration UL timing ahead of DL timing. TA could accommodate a round trip time (RTT) between a bases station and a UE. Since UEs served by a bases station would have different RTTs, if all UE transmit it UL as the same timing as receiving its DL, the UL signals from different UEs would cause interference to each other, as they would not arrive at the same time (or around the same time). To mitigate or eliminate such interference, TA is introduced to allow UL signals (e.g. in a same UL slot or in a same UL symbol) from different UEs arriving the base station (e.g. roughly) at the same time. For a UE closer to a base station, it would be likely to have a shorter TA. For a UE farther from a base station, it would be likely to have a longer TA.

An initial value of TA is obtained before UE perform regular UL transmission. The initial TA value is estimated by a random access procedure. A UE would firstly synchronize its DL timing to a DL signal, e.g. SSB from a base station. After obtaining DL timing, a UE transmits a preamble to a base station. The preamble is transmitted with TA value equal to 0 or a small offset value relative to the DL timing. Design of the preamble sequence allows a base station to estimate TA value of a UE (e.g. amount of time UE needs to advance its transmission timing comparing with transmitting a preamble) when receiving preamble from the UE. The base station would then transmit a response, random access response, comprising a TA value (for that preamble and/or that PRACH resource). The UE could use the TA value to adjust its following UL transmission timing (e.g. a Msg3 transmission). Whether the TA could be continuously used in the following UL transmission may subject to other condition(s), e.g. whether the random access procedure is successfully complete or not. This TA value would be maintained or updated from time to time, e.g. when UL transmission is to be performed.

UE may change its location due to mobility, or the path between a base station and the UE changes, resulting in desired TA value change. The base station could send a TA adjustment value to update UE's TA value. The base station could send an order to request UE to perform a random access procedure. The UE could acquire new TA during the random access procedure. A TA validity timer is maintained by a UE (as well as by a base station) to judge whether a UE has a valid TA or not. If UE does not have valid TA, it is not allowed to transmit most of the UL signal. For example, if UE does not have valid TA, it is not allowed to transmit PUCCH and/or PUSCH and/or SRS. If UE does not have valid TA, it is allowed to transmit PRACH. More details of procedures related to timing advance are provided below from 3GPP TS 38.213, TS 38.211, and TS 38.321.

3GPP Ts 38.213 States:

4 Synchronization Procedures 4.1 Cell Search

Cell search is the procedure for a UE to acquire time and frequency synchronization with a cell and to detect the physical layer Cell ID of the cell.

A UE receives the following synchronization signals (SS) in order to perform cell search: the primary synchronization signal (PSS) and secondary synchronization signal (SSS) as defined in [4, TS 38.211].

A UE assumes that reception occasions of a physical broadcast channel (PBCH), PSS, and SSS are in consecutive symbols, as defined in [4, TS 38.211], and form a SS/PBCH block. The UE assumes that SSS, PBCH DM-RS, and PBCH data have same EPRE. The UE may assume that the ratio of PSS EPRE to SSS EPRE in a SS/PBCH block is either 0 dB or 3 dB. If the UE has not been provided dedicated higher layer parameters, the UE may assume that the ratio of PDCCH DMRS EPRE to SSS EPRE is within-8 dB and 8 dB when the UE monitors PDCCHs for a DCI format 1_0 with CRC scrambled by SI-RNTI, P-RNTI, or RA-RNTI.

For a half frame with SS/PBCH blocks, the first symbol indexes for candidate SS/PBCH blocks are determined according to the SCS of SS/PBCH blocks as follows, where index 0 corresponds to the first symbol of the first slot in a half-frame.

Case A—15 kHz SCS: the first symbols of the candidate SS/PBCH blocks have indexes of $\{2, 8\}+14\cdot n$. For carrier frequencies smaller than or equal to 3 GHZ, $n=0,1$. For carrier frequencies within FR1 larger than 3 GHZ, $n=0, 1, 2, 3$.

Case B—30 kHz SCS: the first symbols of the candidate SS/PBCH blocks have indexes $\{4, 8, 16, 20\}+28\cdot n$. For carrier frequencies smaller than or equal to 3 GHZ, $n=0$. For carrier frequencies within FR1 larger than 3 GHZ, $n=0,1$.

Case C—30 kHz SCS: the first symbols of the candidate SS/PBCH blocks have indexes $\{2,8\}+14\cdot n$.

For paired spectrum operation

For carrier frequencies smaller than or equal to 3 GHZ, $n=0, 1$. For carrier frequencies within FR1 larger than 3 GHZ, $n=0, 1, 2, 3$.

For unpaired spectrum operation

For carrier frequencies smaller than or equal to 2.4 GHZ, $n=0,1$. For carrier frequencies within FR1 larger than 2.4 GHZ, $n=0, 1, 2, 3$.

Case D—120 kHz SCS: the first symbols of the candidate SS/PBCH blocks have indexes $\{4, 8, 16, 20\}+28\cdot n$. For carrier frequencies within FR2, $n=0, 1, 2, 3, 5, 6, 7, 8, 10, 11, 12, 13, 15, 16, 17, 18$.

Case E—240 KHz SCS: the first symbols of the candidate SS/PBCH blocks have indexes $\{8, 12, 16, 20, 32, 36, 40, 44\}+56\cdot n$. For carrier frequencies within FR2, $n=0, 1, 2, 3, 5, 6, 7, 8$.

From the above cases, if the SCS of SS/PBCH blocks is not provided by ssbSubcarrierSpacing, the applicable cases for a cell depend on a respective frequency band, as provided in [8-1, TS 38.101-1] and [8-2, TS 38.101-2]. A same case applies for all SS/PBCH blocks on the cell. If a 30 KHz SS/PBCH block SCS is indicated by ssbSubcarrierSpacing, Case B applies for frequency bands with only 15 kHz SS/PBCH block SCS as specified in [8-1, TS 38.101-1], and the case specified for 30 kHz SS/PBCH block SCS in [8-1, TS 38.101-1] applies for frequency bands with 30 kHz SS/PBCH block SCS or both 15 kHz and 30 kHz SS/PBCH block SCS as specified in [8-1, TS 38.101-1]. For a UE configured to operate with carrier aggregation over a set of cells in a frequency band of FR2 or with frequency-contiguous carrier aggregation over a set of cells in a frequency band of FR1, if the UE is provided SCS values by ssbSubcarrierSpacing for receptions of SS/PBCH blocks on any cells from the set of cells, the UE expects the SCS values to be same.

The candidate SS/PBCH blocks in a half frame are indexed in an ascending order in time from 0 to $L_{max}-1$. A UE determines the 2 LSB bits, for $L=4$, or the 3 LSB bits, for $L_{max}>4$, of a SS/PBCH block index per half frame from a one-to-one mapping with an index of the DM-RS sequence transmitted in the PBCH. For $L_{max}=64$, the UE determines the 3 MSB bits of the SS/PBCH block index per half frame from PBCH payload bits as, $\bar{a}_{\bar{A}+5}$, $\bar{a}_{\bar{A}+6}$, $\bar{a}_{\bar{A}+7}$ as described in [5, TS 38.212].

A UE can be provided per serving cell by ssb-periodicityServingCell a periodicity of the half frames for reception of the SS/PBCH blocks for the serving cell. If the UE is not configured a periodicity of the half frames for receptions of the SS/PBCH blocks, the UE assumes a periodicity of a half frame. A UE assumes that the periodicity is same for all SS/PBCH blocks in the serving cell.

For initial cell selection, a UE may assume that half frames with SS/PBCH blocks occur with a periodicity of 2 frames.

Upon detection of a SS/PBCH block, the UE determines from MIB that a CORESET for Type0-PDCCH CSS set, as described in Subclause 13, is present if $k_{SSB}\leq23$ [4, TS 38.211] for FR1 or if $k_{SSB}\leq11$ for FR2. The UE determines from MIB that a CORESET for Type0-PDCCH CSS set is not present if $k_{SSB}>23$ for FR1 or if $k_{SSB}>11$ for FR2; the CORESET for Type0-PDCCH CSS set may be provided by PDCCH-ConfigCommon.

For a serving cell without transmission of SS/PBCH blocks, a UE acquires time and frequency synchronization with the serving cell based on receptions of SS/PBCH blocks on the PCell, or on the PSCell, of the cell group for the serving cell.

4.2 Transmission Timing Adjustments

A UE can be provided a value $N_{TA,offset}$ of a timing advance offset for a serving cell by n-TimingAdvanceOffset for the serving cell. If the UE is not provided n-TimingAdvanceOffset for a serving cell, the UE determines a default value $N_{TA,offset}$ of the timing advance offset for the serving cell as described in [10, TS 38.133].

If a UE is configured with two UL carriers for a serving cell, a same timing advance offset value $N_{TA,offset}$ applies to both carriers.

Upon reception of a timing advance command for a TAG, the UE adjusts uplink timing for PUSCH/SRS/PUCCH transmission on all the serving cells in the TAG based on a value $N_{TA,offset}$ that the UE expects to be same for all the serving cells in the TAG and based on the received timing advance command where the uplink timing for PUSCH/SRS/PUCCH transmissions is the same for all the serving cells in the TAG.

For a band with synchronous contiguous intra-band EN-DC in a band combination with non-applicable maximum transmit timing difference requirements as described in Note 1 of Table 7.5.3-1 of [10, TS 38.133], if the UE indicates ul-TimingAlignmentEUTRA-NR as 'required' and uplink transmission timing based on timing adjustment indication for a TAG from MCG and a TAG from SCG are determined to be different by the UE, the UE adjusts the transmission timing for PUSCH/SRS/PUCCH transmission on all serving cells part of the band with the synchronous contiguous intra-band EN-DC based on timing adjustment indication for a TAG from a serving cell in MCG in the band. The UE is not expected to transmit a PUSCH/SRS/PUCCH in one CG when the PUSCH/SRS/PUCCH is overlapping in time, even partially, with random access preamble transmitted in another CG.

For a SCS of $2^\mu \cdot 15$ kHz, the timing advance command for a TAG indicates the change of the uplink timing relative to the current uplink timing for the TAG in multiples of $16 \cdot 64 \cdot T_c/2^\mu$. The start timing of the random access preamble is described in [4, TS 38.211]. In case of random access response, a timing advance command [11, TS 38.321], TA, for a TAG indicates $N_{TA}$ values by index values of $T_A=0, 1, 2, \ldots, 3846$, where an amount of the time alignment for the TAG with SCS of $2^\mu \cdot 15$ KHz is $N_{TA}=T_A \cdot 16 \cdot 64/2^\mu$. $N_{TA}$ is defined in [4, TS 38.211] and is relative to the SCS of the first uplink transmission from the UE after the reception of the random access response.

In other cases, a timing advance command [11, TS 38.321], $T_A$, for a TAG indicates adjustment of a current $N_{TA}$ value, $N_{TA\_old}$, to the new $N_{TA}$ value, $N_{TA\_new}$, by index values of $T_A=0, 1, 2, \ldots, 63$, where for a SCS of $2^\mu \cdot 15$ KHz, $N_{TA\_new}=N_{TA\_old}+(T_A-31) \cdot 16 \cdot 64/2^\mu$.

If a UE has multiple active UL BWPs, as described in Subclause 12, in a same TAG, including UL BWPs in two UL carriers of a serving cell, the timing advance command value is relative to the largest SCS of the multiple active UL BWPs. The applicable $N_{TA\_new}$ value for an UL BWP with lower SCS may be rounded to align with the timing advance granularity for the UL BWP with the lower SCS while satisfying the timing advance accuracy requirements in [10, TS38.133].

Adjustment of an $N_{TA}$ value by a positive or a negative amount indicates advancing or delaying the uplink transmission timing for the TAG by a corresponding amount, respectively.

For a timing advance command received on uplink slot n and for a transmission other than a PUSCH scheduled by a RAR UL grant as described in Subclause 8.3, the corresponding adjustment of the uplink transmission timing applies from the beginning of uplink slot n+k+1 where $$k = \left\lceil N_{slot}^{subframe,\mu} \cdot (N_{T,1} + N_{T,2} + N_{TA,max} + 0.5)/T_{sf} \right\rceil, N_{T,1}$$

is a time duration in msec of $N_1$ symbols corresponding to a PDSCH processing time for UE processing capability 1 when additional PDSCH DM-RS is configured, $N_{T,2}$ is a time duration in msec of $N_2$ symbols corresponding to a PUSCH preparation time for UE processing capability 1 [6, TS 38.214], $N_{TA,max}$ is the maximum timing advance value in msec that can be provided by a TA command field of 12 bits, $$N_{slot}^{subframe,\mu}$$

the number of slots per subframe, and $T_{sf}$ is the subframe duration of 1 msec. $N_1$ and $N_2$ are determined with respect to the minimum SCS among the SCSs of all configured UL BWPs for all uplink carriers in the TAG and of all configured DL BWPs for the corresponding downlink carriers. For $\mu=0$, the UE assumes $N_{1,0}=14$ [6, TS 38.214]. Slot n and $$N_{slot}^{subframe,\mu}$$

are determined with respect to the minimum SCS among the SCSs of all configured UL BWPs for all uplink carriers in the TAG. $N_{TA,max}$ is determined with respect to the minimum SCS among the SCSs of all configured UL BWPs for all uplink carriers in the TAG and for all configured initial UL BWPs provided by initialUplinkBWP. The uplink slot n is the last slot among uplink slot(s) overlapping with the slot(s) of PDSCH reception assuming $T_{TA}=0$, where the PDSCH provides the timing advance command and $T_{TA}$ is defined in [4, TS 38.211].

If a UE changes an active UL BWP between a time of a timing advance command reception and a time of applying a corresponding adjustment for the uplink transmission timing, the UE determines the timing advance command value based on the SCS of the new active UL BWP. If the UE changes an active UL BWP after applying an adjustment for the uplink transmission timing, the UE assumes a same absolute timing advance command value before and after the active UL BWP change.

If the received downlink timing changes and is not compensated or is only partly compensated by the uplink timing adjustment without timing advance command as described in [10, TS 38.133], the UE changes $N_{TA}$ accordingly.

If two adjacent slots overlap due to a $T_A$ command, the latter slot is reduced in duration relative to the former slot.

[ . . . ]

8 Random Access Procedure

Prior to initiation of the physical random access procedure, Layer 1 receives from higher layers a set of SS/PBCH block indexes and provides to higher layers a corresponding set of RSRP measurements.

Prior to initiation of the physical random access procedure, Layer 1 receives the following information from the higher layers:

Configuration of physical random access channel (PRACH) transmission parameters (PRACH preamble format, time resources, and frequency resources for PRACH transmission).

Parameters for determining the root sequences and their cyclic shifts in the PRACH preamble sequence set (index to logical root sequence table, cyclic shift ($N_{CS}$), and set type (unrestricted, restricted set A, or restricted set B)).

From the physical layer perspective, the L1 random access procedure includes the transmission of random access preamble (Msg1) in a PRACH, random access response (RAR) message with a PDCCH/PDSCH (Msg2), and when applicable, the transmission of a PUSCH scheduled by a RAR UL grant, and PDSCH for contention resolution.

If a random access procedure is initiated by a PDCCH order to the UE, a PRACH transmission is with a same SCS as a PRACH transmission initiated by higher layers.

If a UE is configured with two UL carriers for a serving cell and the UE detects a PDCCH order, the UE uses the UL/SUL indicator field value from the detected PDCCH order to determine the UL carrier for the corresponding PRACH transmission.

8.1 Random Access Preamble

Physical random access procedure is triggered upon request of a PRACH transmission by higher layers or by a PDCCH order. A configuration by higher layers for a PRACH transmission includes the following:

A configuration for PRACH transmission [4, TS 38.211].

A preamble index, a preamble SCS, $P_{PRACH,target}$, a corresponding RA-RNTI, and a PRACH resource.

A PRACH is transmitted using the selected PRACH format with transmission power $P_{PRACH,b,f,c}(i)$, as described in Subclause 7.4, on the indicated PRACH resource.

A UE is provided a number N of SS/PBCH blocks associated with one PRACH occasion and a number R of contention based preambles per SS/PBCH block per valid PRACH occasion by ssb-perRACH-OccasionAndCB-PreamblesPerSSB. If N≤1, one SS/PBCH block is mapped to 1/N consecutive valid PRACH occasions and R contention based preambles with consecutive indexes associated with the SS/PBCH block per valid PRACH occasion start from preamble index 0. If N≥1, R contention based preambles with consecutive indexes associated with SS/PBCH block n, 0≤n≤N−1, per valid PRACH occasion start from preamble index $$n \cdot N_{preamble}^{total}/N$$

where $$N_{preamble}^{total}$$

is provided by totalNumberOfRA-Preambles and is an integer multiple of N.

For link recovery, a UE is provided N SS/PBCH blocks associated with one PRACH occasion by ssb-perRACH-Occasion in BeamFailureRecoveryConfig. For a dedicated RACH configuration provided by RACH-ConfigDedicated, if cfra is provided, a UE is provided N SS/PBCH blocks associated with one PRACH occasion by ssb-perRACH-Occasion in occasions. If N<1, one SS/PBCH block is mapped to 1/N consecutive valid PRACH occasions. If N≥1, all consecutive N SS/PBCH blocks are associated with one PRACH occasion.

SS/PBCH block indexes provided by ssb-PositionsInBurst in SIB1 or in ServingCellConfigCommon are mapped to valid PRACH occasions in the following order where the parameters are described in [4, TS 38.211].

First, in increasing order of preamble indexes within a single PRACH occasion

Second, in increasing order of frequency resource indexes for frequency multiplexed PRACH occasions Third, in increasing order of time resource indexes for time multiplexed PRACH occasions within a PRACH slot Fourth, in increasing order of indexes for PRACH slots An association period, starting from frame 0, for mapping SS/PBCH blocks to PRACH occasions is the smallest value in the set determined by the PRACH configuration period according Table 8.1-1 such that $$N_{Tx}^{SSB}$$

SS/PBCH blocks are mapped at least once to the PRACH occasions within the association period, where a UE obtains $$N_{Tx}^{SSB}$$

from the value of ssb-PositionsInBurst in in SIB1 or in ServingCellConfigCommon. If after an integer number of SS/PBCH blocks to PRACH occasions mapping cycles within the association period there is a set of PRACH occasions that are not mapped to $$N_{Tx}^{SSB}$$

SS/PBCH blocks, no SS/PBCH blocks are mapped to the set of PRACH occasions. An association pattern period includes one or more association periods and is determined so that a pattern between PRACH occasions and SS/PBCH blocks repeats at most every 160 msec. PRACH occasions not associated with SS/PBCH blocks after an integer number of association periods, if any, are not used for PRACH transmissions.

For a PRACH transmission triggered by a PDCCH order, the PRACH mask index field [5, TS 38.212], if the value of the random access preamble index field is not zero, indicates the PRACH occasion for the PRACH transmission where the PRACH occasions are associated with the SS/PBCH block index indicated by the SS/PBCH block index field of the PDCCH order.

For a PRACH transmission triggered by higher layers, if ssb-ResourceList is provided, the PRACH mask index is indicated by ra-ssb-OccasionMaskIndex which indicates the PRACH occasions for the PRACH transmission where the PRACH occasions are associated with the selected SS/PBCH block index.

The PRACH occasions are mapped consecutively per corresponding SS/PBCH block index. The indexing of the PRACH occasion indicated by the mask index value is reset per mapping cycle of consecutive PRACH occasions per SS/PBCH block index. The UE selects for a PRACH transmission the PRACH occasion indicated by PRACH mask index value for the indicated SS/PBCH block index in the first available mapping cycle.

For the indicated preamble index, the ordering of the PRACH occasions is

First, in increasing order of frequency resource indexes for frequency multiplexed PRACH occasions Second, in increasing order of time resource indexes for time multiplexed PRACH occasions within a PRACH slot Third, in increasing order of indexes for PRACH slots For a PRACH transmission triggered upon request by higher layers, a value of ra-OccasionList [12, TS 38.331], if csirs-ResourceList is provided, indicates a list of PRACH occasions for the PRACH transmission where the PRACH occasions are associated with the selected CSI-RS index indicated by csi-RS. The indexing of the PRACH occasions indicated by ra-OccasionList is reset per association pattern period.

[Table 8.1-1 of 3GPP TS 38.321 V15.7.0, Entitled "Mapping Between PRACH Configuration Period and SS/PBCH Block to PRACH Occasion Association Period", is Reproduced as FIG. 10]

For paired spectrum all PRACH occasions are valid. For unpaired spectrum, if a UE is not provided tdd-UL-DL-ConfigurationCommon, a PRACH occasion in a PRACH slot is valid if it does not precede a SS/PBCH block in the PRACH slot and starts at least $N_{gap}$ symbols after a last SS/PBCH block reception symbol, where $N_{gap}$ is provided in Table 8.1-2.

If a UE is provided tdd-UL-DL-ConfigurationCommon, a PRACH occasion in a PRACH slot is valid if it is within UL symbols, or it does not precede a SS/PBCH block in the PRACH slot and starts at least $N_{gap}$ symbols after a last downlink symbol and at least $N_{gap}$ symbols after a last SS/PBCH block transmission symbol, where $N_{gap}$ is provided in Table 8.1-2.

For preamble format B4 [4, TS 38.211], $N_{gap}=0$.

[Table 8.1-2 of 3GPP TS 38.321 V15.7.0, Entitled "$N_{gap}$ Values for Different Preamble SCS μ", is Reproduced as FIG. 11]

If a random access procedure is initiated by a PDCCH order, the UE, if requested by higher layers, transmits a PRACH in the selected PRACH occasion, as described in [11, TS 38.321], for which a time between the last symbol of the PDCCH order reception and the first symbol of the PRACH transmission is larger than or equal to $N_{T,2}+\Delta_{BWPSwitching}+\Delta_{Delay}$ msec, where $N_{T,2}$ is a time duration of $N_2$ symbols corresponding to a PUSCH preparation time for UE processing capability 1 [6, TS 38.214], $\Delta_{BWPSwitching}=0$ if the active UL BWP does not change and $\Delta_{BWPSwitching}$ is defined in [10, TS 38.133] otherwise, and $\Delta_{Delay}=0.5$ msec for FR1 and $\Delta_{Delay}=0.25$ msec for FR2. For a PRACH transmission using 1.25 kHz or 5 kHz SCS, the UE determines $N_2$ assuming SCS configuration μ=0.

For single cell operation or for operation with carrier aggregation in a same frequency band, a UE does not transmit PRACH and PUSCH/PUCCH/SRS in a same slot or when a gap between the first or last symbol of a PRACH transmission in a first slot is separated by less than N symbols from the last or first symbol, respectively, of a PUSCH/PUCCH/SRS transmission in a second slot where N=2 for μ=0 or μ=1, N=4 for μ=2 or μ=3, and μ is the SCS configuration for the active UL BWP.

8.2 Random Access Response

In response to a PRACH transmission, a UE attempts to detect a DCI format 1_0 with CRC scrambled by a corresponding RA-RNTI during a window controlled by higher layers [11, TS 38.321]. The window starts at the first symbol of the earliest CORESET the UE is configured to receive PDCCH for Type1-PDCCH CSS set, as defined in Subclause 10.1, that is at least one symbol, after the last symbol of the PRACH occasion corresponding to the PRACH transmission, where the symbol duration corresponds to the SCS for Type1-PDCCH CSS set as defined in Subclause 10.1. The length of the window in number of slots, based on the SCS for Type1-PDCCH CSS set, is provided by ra-Response-Window.

If the UE detects the DCI format 1_0 with CRC scrambled by the corresponding RA-RNTI and a transport block in a corresponding PDSCH within the window, the UE passes the transport block to higher layers. The higher layers parse the transport block for a random access preamble identity (RAPID) associated with the PRACH transmission. If the higher layers identify the RAPID in RAR message(s) of the transport block, the higher layers indicate an uplink grant to the physical layer. This is referred to as random access response (RAR) UL grant in the physical layer.

If the UE does not detect the DCI format 1_0 with CRC scrambled by the corresponding RA-RNTI within the window, or if the UE does not correctly receive the transport block in the corresponding PDSCH within the window, or if the higher layers do not identify the RAPID associated with the PRACH transmission from the UE, the higher layers can indicate to the physical layer to transmit a PRACH. If requested by higher layers, the UE is expected to transmit a PRACH no later than $N_{T,1}+0.75$ msec after the last symbol of the window, or the last symbol of the PDSCH reception, where $N_{T,1}$ is a time duration of $N_1$ symbols corresponding to a PDSCH processing time for UE processing capability 1 when additional PDSCH DM-RS is configured. For μ=0, the UE assumes $N_{1,0}=14$ [6, TS 38.214].

If the UE detects a DCI format 1_0 with CRC scrambled by the corresponding RA-RNTI and receives a transport block in a corresponding PDSCH, the UE may assume same DM-RS antenna port quasi co-location properties, as described in [6, TS 38.214], as for a SS/PBCH block or a CSI-RS resource the UE used for PRACH association, as described in Subclause 8.1, regardless of whether or not the UE is provided TCI-State for the CORESET where the UE receives the PDCCH with the DCI format 1_0. If the UE attempts to detect the DCI format 1_0 with CRC scrambled by the corresponding RA-RNTI in response to a PRACH transmission initiated by a PDCCH order that triggers a contention-free random access procedure for the SpCell [11, TS 38.321], the UE may assume that the PDCCH that includes the DCI format 1_0 and the PDCCH order have same DM-RS antenna port quasi co-location properties. If the UE attempts to detect the DCI format 1_0 with CRC scrambled by the corresponding RA-RNTI in response to a PRACH transmission initiated by a PDCCH order that triggers a contention-free random access procedure for a secondary cell, the UE may assume the DM-RS antenna port quasi co-location properties of the CORESET associated with the Type1-PDCCH CSS set for receiving the PDCCH that includes the DCI format 1_0.

A RAR UL grant schedules a PUSCH transmission from the UE. The contents of the RAR UL grant, starting with the MSB and ending with the LSB, are given in Table 8.2-1.

If the value of the frequency hopping flag is 0, the UE transmits the PUSCH without frequency hopping; otherwise, the UE transmits the PUSCH with frequency hopping.

The UE determines the MCS of the PUSCH transmission from the first sixteen indexes of the applicable MCS index table for PUSCH as described in [6, TS 38.214].

The TPC command value $\delta_{msg2,b,f,c}$ is used for setting the power of the PUSCH transmission, as described in Subclause 7.1.1, and is interpreted according to Table 8.2-2. The CSI request field is reserved.

[Table 8.2-1 of 3GPP TS 38.321 V15.7.0, Entitled "Random Access Response Grant Content Field Size", is Reproduced as FIG. 12]

[Table 8.2-2 of 3GPP TS 38.321 V15.7.0, Entitled "TPC Command $\delta_{msg2,b,f,c}$ for PUSCH", is Reproduced as FIG. 13]

Unless the UE is configured a SCS, the UE receives subsequent PDSCH using same SCS as for the PDSCH reception providing the RAR message.

If the UE does not detect the DCI format with CRC scrambled by the corresponding RA-RNTI or the UE does not correctly receive a corresponding transport block within the window, the UE procedure is as described in [11, TS 38.321].

8.3 PUSCH Scheduled by RAR UL Grant

An active UL BWP, as described in Subclause 12 and in [4, TS 38.211], for a PUSCH transmission scheduled by a RAR UL grant is indicated by higher layers. For determining the frequency domain resource allocation for the PUSCH transmission within the active UL BWP if the active UL BWP and the initial UL BWP have same SCS and same CP length and the active UL BWP includes all RBs of the initial UL BWP, or the active UL BWP is the initial UL BWP, the initial UL BWP is used else, the RB numbering starts from the first RB of the active UL BWP and the maximum number of RBs for frequency domain resource allocation equals the number of RBs in the initial UL BWP The frequency domain resource allocation is by uplink resource allocation type 1 [6, TS 38.214]. For an initial UL BWP size of $$N_{BWP}^{size}$$

RBs, a UE processes the frequency domain resource assignment field as follows if $$N_{BWP}^{size} \leq 180$$

truncate the frequency domain resource assignment field to its $$\lceil \log_2(N_{BWP}^{size} \cdot (N_{BWP}^{size} + 1)/2) \rceil$$

least significant bits and interpret the truncated frequency resource assignment field as for the frequency resource assignment field in DCI format 0_0 as described in [5, TS 38.212]

else insert $$\lceil \log_2(N_{BWP}^{size} \cdot (N_{BWP}^{size} + 1)/2) \rceil - 14$$

most significant bits with value set to '0' after the $N_{UL,hop}$ bits to the frequency domain resource assignment field, where $N_{UL,hop}=0$ if the frequency hopping flag is set to '0' and $N_{UL,hop}$ is provided in Table 8.3-1 if the hopping flag bit is set to '1', and interpret the expanded frequency resource assignment field as for the frequency resource assignment field in DCI format 0_0 as described in [5, TS 38.212]

end if

A UE determines whether or not to apply transform precoding as described in [6, TS 38.214].

For a PUSCH transmission with frequency hopping scheduled by RAR UL grant or for a Msg3 PUSCH retransmission, the frequency offset for the second hop [6, TS 38.214] is given in Table 8.3-1.

[Table 8.3-1 of 3GPP TS 38.321 V15.7.0, Entitled "Frequency Offset for Second Hop of PUSCH Transmission with Frequency Hopping Scheduled by RAR UL Grant or of Msg3 PUSCH Retransmission", is Reproduced as FIG. 14]

A SCS for the PUSCH transmission is provided by subcarrierSpacing in BWP-UplinkCommon. A UE transmits PRACH and the PUSCH on a same uplink carrier of a same serving cell.

A UE transmits a transport block in a PUSCH scheduled by a RAR UL grant in a corresponding RAR message using redundancy version number 0. If a TC-RNTI is provided by higher layers, the scrambling initialization of the PUSCH corresponding to the RAR UL grant in clause 8.2 is by TC-RNTI. Otherwise, the scrambling initialization of the PUSCH corresponding to the RAR UL grant in clause 8.2 is by C-RNTI. Msg3 PUSCH retransmissions, if any, of the transport block, are scheduled by a DCI format 0_0 with CRC scrambled by a TC-RNTI provided in the corresponding RAR message [11, TS 38.321]. The UE always transmits the PUSCH scheduled by a RAR UL grant without repetitions.

With reference to slots for a PUSCH transmission scheduled by a RAR UL grant, if a UE receives a PDSCH with a RAR message ending in slot n for a corresponding PRACH transmission from the UE, the UE transmits the PUSCH in slot $n+k_2+\Delta$, where $k_2$ and $\Delta$ are provided in [6, TS 38.214].

The UE may assume a minimum time between the last symbol of a PDSCH reception conveying a RAR message with a RAR UL grant and the first symbol of a corresponding PUSCH transmission scheduled by the RAR UL grant is equal to $N_{T,1}+N_{T,2}+0.5$ msec, where $N_{T,1}$ is a time duration of $N_1$ symbols corresponding to a PDSCH processing time for UE processing capability 1 when additional PDSCH DM-RS is configured, $N_{T,2}$ is a time duration of $N_2$ symbols corresponding to a PUSCH preparation time for UE processing capability 1 [6, TS 38.214] and, for determining the minimum time, the UE considers that $N_1$ and $N_2$ correspond to the smaller of the SCS configurations for the PDSCH and the PUSCH. For $\mu=0$, the UE assumes $N_{1,0}=14$ [6, TS 38.214].

8.4 PDSCH with UE Contention Resolution Identity

In response to a PUSCH transmission scheduled by a RAR UL grant when a UE has not been provided a C-RNTI, the UE attempts to detect a DCI format 1_0 with CRC scrambled by a corresponding TC-RNTI scheduling a PDSCH that includes a UE contention resolution identity [11, TS 38.321]. In response to the PDSCH reception with the UE contention resolution identity, the UE transmits HARQ-ACK information in a PUCCH. The PUCCH transmission is within a same active UL BWP as the PUSCH transmission. A minimum time between the last symbol of the PDSCH reception and the first symbol of the corresponding PUCCH transmission with the HARQ-ACK information is equal to $N_{T,1}+0.5$ msec. $N_{T,1}$ is a time duration of MI symbols corresponding to a PDSCH processing time for UE processing capability 1 when additional PDSCH DM-RS is configured. For $\mu=0$, the UE assumes $N_{1,0}=14$ [6, TS 38.214].

When detecting a DCI format in response to a PUSCH transmission scheduled by a RAR UL grant, as described in [11, TS 38.321], or corresponding PUSCH retransmission scheduled by a DCI format 0_0 with CRC scrambled by a TC-RNTI provided in the corresponding RAR message [11, TS 38.321], the UE may assume the PDCCH carrying the DCI format has the same DM-RS antenna port quasi co-location properties, as described in [6, TS 38.214], as for a SS/PBCH block the UE used for PRACH association, as described in Subclause 8.1, regardless of whether or not the UE is provided TCI-State for the CORESET where the UE receives the PDCCH with the DCI format.

3GPP Ts 38.211 States: 4.3.1 Frames and Subframes

Downlink and uplink transmissions are organized into frames with $T_f = (\Delta f_{max} N_f/100) \cdot T_c = 10$ ms duration, each consisting of ten subframes of $T_{sf} = (\Delta f_{max} N_f/1000) \cdot T_c = 1$ ms duration. The number of consecutive OFDM symbols per subframe is $$N_{symb}^{subframe,\mu} = N_{symb}^{slot} N_{slot}^{subframe,\mu}.$$

Each frame is divided into two equally-sized half-frames of five subframes each with half-frame 0 consisting of subframes 0-4 and half-frame 1 consisting of subframes 5-9.

There is one set of frames in the uplink and one set of frames in the downlink on a carrier. Uplink frame number i for transmission from the UE shall start $T_{TA} = (N_{TA} + N_{TA,offset}) T_c$ before the start of the corresponding downlink frame at the UE where $N_{TA,offset}$ is given by [5, TS 38.213].

Figure 15:
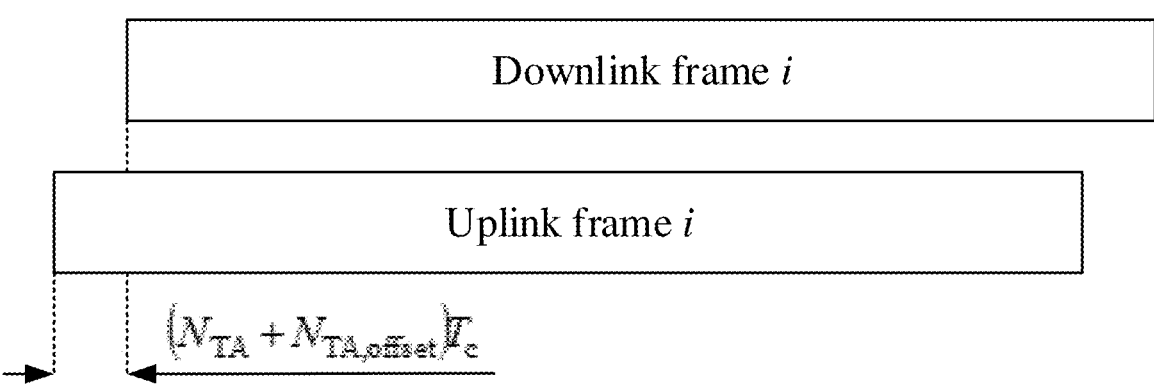
FIG. 15 is a reproduction of FIG. 4.3.1-1 of 3GPP TS 38.211 V15.7.0.

[FIG. 4.3.1-1 of 3GPP TS 38.211 V15.7.0, Entitled "Uplink-Downlink Timing Relation", is Reproduced as FIG. 15]

[ . . . ]

5.3.2 OFDM Baseband Signal Generation for PRACH

The time-continuous signal $$s_l^{(p,\mu)}(t)$$

on antenna port p for PRACH is defined by $$s_l^{(p,\mu)}(t) = \sum_{k=0}^{L_{RA}-1} a_k^{(p,RA)} e^{j2\pi(k+Kk_1+\bar{k})\Delta f_{RA}\left(t-N_{CP,l}^{RA}T_c-t_{start}^{RA}\right)}$$

$$K = \Delta f/\Delta f_{RA}$$

$$k_1 = k_0^\mu + \left(N_{BWP,i}^{start} - N_{grid}^{start,\mu}\right)N_{sc}^{RB} + n_{RA}^{start}N_{sc}^{RB} + n_{RA}N_{RB}^{RA}N_{sc}^{RB} - N_{grid}^{size,\mu}N_{sc}^{RB}/2$$

$$k_0^\mu = \left(N_{grid}^{start,\mu} + N_{grid}^{size,\mu}/2\right)N_{sc}^{RB} - \left(N_{grid}^{start,\mu_0} + N_{grid}^{size,\mu_0}/2\right)N_{sc}^{RB}2^{\mu_0-\mu}$$

where $$t_{start}^{RA} \le t < t_{start}^{RA} + \left(N_u + N_{CP,l}^{RA}\right)T_c$$

and $\bar{k}$ is given by clause 6.3.3;

$\Delta f$ is the subcarrier spacing of the initial uplink bandwidth part during initial access.

Otherwise, $\Delta f$ is the subcarrier spacing of the active uplink bandwidth part;

$\mu_0$ is the largest $\mu$ value among the subcarrier spacing configurations by the higher-layer parameter scs-SpecificCarrierList;

$$N_{BWP,i}^{start}$$

is the lower numbered resource block of the initial uplink bandwidth part and is derived by the higher-layer parameter initialUplinkBWP during initial access. Otherwise, $$N_{BWP,i}^{start}$$

is the lowest numbered resource block of the active uplink bandwidth part and is derived by the higher-layer parameter BWP-Uplink;

$$n_{RA}^{start}$$

is the frequency offset of the lowest PRACH transmission occasion in frequency domain with respect to PRB 0 of the initial uplink bandwidth part given by the higher-layer parameter msg1-FrequencyStart during initial access associated with the initial uplink bandwidth part. Otherwise, $$n_{RA}^{start}$$

is the frequency offset of lowest PRACH transmission occasion in frequency domain with respect to physical resource block 0 of the active uplink bandwidth part given by the higher-layer parameter msg1-FrequencyStart associated with the active uplink bandwidth part;

$r_{RA}$ is the PRACH transmission occasion index in frequency domain for a given PRACH transmission occasion in one time instance as given by clause 6.3.3.2;

$$N_{RB}^{RA}$$

is the number of resource blocks occupied and is given by the parameter allocation expressed in number of RBs for PUSCH in Table 6.3.3.2-1.

$L_{RA}$ and $N_u$ are given by clause 6.3.3

$$N_{CP,l}^{RA} = N_{CP}^{RA} + n \cdot 16\kappa$$

where for $\Delta f_{RA} \in \{1.25, 5\}$ kHz, n=0 for $\Delta f_{RA} \in \{15, 30, 60, 120\}$ kHz, n is the number of times the interval $$\left[t_{start}^{RA}, t_{start}^{RA} + \left(N_u^{RA} + N_{CP}^{RA}\right)T_c\right[$$

overlaps with either time instance 0 or time instance $(\Delta f_{max} N_f/2000) \cdot T_c = 0.5$ ms in a subframe The starting position $$t_{start}^{RA}$$

25 of the PRACH preamble in a subframe (for $\Delta f_{RA}\{1.25, 5, 15, 30\}$ kHz) or in a 60 KHz slot (for $\Delta f_{RA} \in \{60,120\}$ kHz) is given by $$t_{start}^{RA} = t_{start,l}^{\mu}$$

$$t_{start,l}^{\mu} = \begin{cases} 0 & l = 0 \\ t_{start,l-1}^{\mu} + \left(N_u^{\mu} + N_{CP,l-1}^{\mu}\right) \cdot T_c & \text{otherwise} \end{cases}$$

where
the subframe or 60 KHz slot is assumed to start at t=0;
a timing advance value $N_{TA}$=0 shall be assumed;

$$N_u^{\mu}$$

and $$N_{CP,l-1}^{\mu}$$

are given by clause 5.3.1;
$\mu$=0 shall be assumed for $\Delta f_{RA}$={1.25,5} kHz, otherwise it is given by $\Delta f_{RA}$={15, 30, 60, 120} kHz and the symbol position l is given by $$l = l_0 + n_t^{RA} N_{dur}^{RA} + 14 n_{slot}^{RA}$$

where
$l_0$ is given by the parameter "starting symbol" in Tables 6.3.3.2-2 to 6.3.3.2-4;

$$n_t^{RA}$$

is the PRACH transmission occasion within the PRACH slot, numbered in increasing order from 0 to $$N_t^{RA,slot} - 1$$

within a RACH slot where $$N_t^{RA,slot}$$

is given Tables 6.3.3.2-2 to 6.3.3.2-4 for $L_{RA}$=139 and fixed to 1 for $L_{RA}$=839;

$$N_{dur}^{RA}$$

is given by Tables 6.3.3.2-2 to 6.3.3.2-4;

$$n_{slot}^{RA}$$

26 is given by
if $\Delta f_{RA} \in \{1.25, 5, 15, 60\}$ kHz, then $$n_{slot}^{RA} = 0$$

if $\Delta f_{RA} \in \{30,120\}$ KHz and either of "Number of PRACH slots within a subframe" in Tables 6.3.3.2-2 to 6.3.3.2-3 or "Number of PRACH slots within a 60 kHz slot" in Table 6.3.3.2-4 is equal to 1, then $$n_{slot}^{RA} = 1$$

otherwise.

$$n_{slot}^{RA} \in \{0, 1\}$$

If the preamble format given by Tables 6.3.3.2-2 to 6.3.3.2-4 is A1/B1, A2/B2 or A3/B3, then
if $$n_t^{RA} = N_t^{RA,slot} - 1,$$

then the PRACH preamble with the corresponding PRACH preamble format from B1, B2 and B3 is transmitted in the PRACH transmission occasion;
otherwise the PRACH preamble with the corresponding PRACH preamble format from A1, A2 and A3 is transmitted in the PRACH transmission occasion
3GPP TS 38.321 States:
5.1 Random Access Procedure
5.1.1 Random Access Procedure Initialization
The Random Access procedure described in this clause is initiated by a PDCCH order, by the MAC entity itself, or by RRC for the events in accordance with TS 38.300 [2]. There is only one Random Access procedure ongoing at any point in time in a MAC entity. The Random Access procedure on an SCell shall only be initiated by a PDCCH order with ra-PreambleIndex different from 0b000000.
NOTE 1: If a new Random Access procedure is triggered while another is already ongoing in the MAC entity, it is up to UE implementation whether to continue with the ongoing procedure or start with the new procedure (e.g. for SI request).
RRC configures the following parameters for the Random Access procedure:
prach-ConfigurationIndex: the available set of PRACH occasions for the transmission of the Random Access Preamble;
preambleReceivedTargetPower: initial Random Access Preamble power;
rsrp-ThresholdSSB: an RSRP threshold for the selection of the SSB. If the Random Access procedure is initiated for beam failure recovery, rsrp-ThresholdSSB used for the selection of the SSB within candidateBeamRSList refers to rsrp-ThresholdSSB in BeamFailureRecovery-Config IE;
rsrp-ThresholdCSI-RS: an RSRP threshold for the selection of CSI-RS. If the Random Access procedure is initiated for beam failure recovery, rsrp-ThresholdCSI-RS is equal to rsrp-ThresholdSSB in BeamFailureRecoveryConfig IE;

rsrp-ThresholdSSB-SUL: an RSRP threshold for the selection between the NUL carrier and the SUL carrier;

candidateBeamRSList: a list of reference signals (CSI-RS and/or SSB) identifying the candidate beams for recovery and the associated Random Access parameters;

recoverySearchSpaceId: the search space identity for monitoring the response of the beam failure recovery request;

powerRampingStep: the power-ramping factor;

powerRampingStepHighPriority: the power-ramping factor in case of prioritized Random Access procedure;

scalingFactorBI: a scaling factor for prioritized Random Access procedure;

ra-PreambleIndex: Random Access Preamble;

ra-ssb-OccasionMaskIndex: defines PRACH occasion(s) associated with an SSB in which the MAC entity may transmit a Random Access Preamble (see clause 7.4);

ra-OccasionList: defines PRACH occasion(s) associated with a CSI-RS in which the MAC entity may transmit a Random Access Preamble;

ra-PreambleStartIndex: the starting index of Random Access Preamble(s) for on-demand SI request;

preambleTransMax: the maximum number of Random Access Preamble transmission;

ssb-perRACH-OccasionAndCB-PreamblesPerSSB: defines the number of SSBs mapped to each PRACH occasion and the number of contention-based Random Access Preambles mapped to each SSB;

if groupBconfigured is configured, then Random Access Preambles group B is configured.

Amongst the contention-based Random Access Preambles associated with an SSB (as defined in TS 38.213 [6]), the first numberOfRA-PreamblesGroupA Random Access Preambles belong to Random Access Preambles group A. The remaining Random Access Preambles associated with the SSB belong to Random Access Preambles group B (if configured).

NOTE 2: If Random Access Preambles group B is supported by the cell Random Access Preambles group B is included for each SSB.

if Random Access Preambles group B is configured:

ra-Msg3SizeGroupA: the threshold to determine the groups of Random Access Preambles;

msg3-DeltaPreamble: APREAMBLE_Msg3 in TS 38.213 [6];

messagePowerOffsetGroupB: the power offset for preamble selection;

numberOfRA-PreamblesGroupA: defines the number of Random Access Preambles in Random Access Preamble group A for each SSB.

the set of Random Access Preambles and/or PRACH occasions for SI request, if any;

the set of Random Access Preambles and/or PRACH occasions for beam failure recovery request, if any;

the set of Random Access Preambles and/or PRACH occasions for reconfiguration with sync, if any;

ra-ResponseWindow: the time window to monitor RA response(s) (SpCell only);

ra-ContentionResolutionTimer: the Contention Resolution Timer (SpCell only).

In addition, the following information for related Serving Cell is assumed to be available for UEs:

if Random Access Preambles group B is configured:

if the Serving Cell for the Random Access procedure is configured with supplementary uplink as specified in TS 38.331 [5], and SUL carrier is selected for performing Random Access Procedure:

$P_{CMAX,f,c}$ of the SUL carrier as specified in TS 38.101-1 [14], TS 38.101-2 [15], and TS 38.101-3 [16].

else:

$P_{CMAX,f,c}$ of the NUL carrier as specified in TS 38.101-1 [14], TS 38.101-2 [15], and TS 38.101-3 [16].

The following UE variables are used for the Random Access procedure:

PREAMBLE_INDEX;

PREAMBLE_TRANSMISSION_COUNTER;

PREAMBLE_POWER_RAMPING_COUNTER;

PREAMBLE_POWER_RAMPING_STEP;

PREAMBLE_RECEIVED_TARGET_POWER;

PREAMBLE_BACKOFF;

PCMAX;

SCALING_FACTOR_BI;

TEMPORARY_C-RNTI.

When the Random Access procedure is initiated on a Serving Cell, the MAC entity shall:

1> flush the Msg3 buffer;

1> set the PREAMBLE_TRANSMISSION_COUNTER to 1;

1> set the PREAMBLE_POWER_RAMPING_COUNTER to 1;

1> set the PREAMBLE_BACKOFF to 0 ms;

1> if the carrier to use for the Random Access procedure is explicitly signalled:

2> select the signalled carrier for performing Random Access procedure;

2> set the PCMAX to $P_{CMAX,f,c}$ of the signalled carrier.

1> else if the carrier to use for the Random Access procedure is not explicitly signalled; and 1> if the Serving Cell for the Random Access procedure is configured with supplementary uplink as specified in TS 38.331 [5]; and 1> if the RSRP of the downlink pathloss reference is less than rsrp-ThresholdSSB-SUL:

2> select the SUL carrier for performing Random Access procedure;

2> set the PCMAX to $P_{CMAX,f,c}$ of the SUL carrier.

1> else:

2> select the NUL carrier for performing Random Access procedure;

2> set the PCMAX to $P_{CMAX,f,c}$ of the NUL carrier.

1> perform the BWP operation as specified in clause 5.15;

1> set PREAMBLE_POWER_RAMPING_STEP to powerRampingStep;

1> set SCALING_FACTOR_BI to 1;

1> if the Random Access procedure was initiated for beam failure recovery (as specified in clause 5.17); and 1> if beamFailureRecoveryConfig is configured for the active UL BWP of the selected carrier:

2> start the beamFailureRecoveryTimer, if configured;

2> apply the parameters powerRampingStep, preambleReceivedTargetPower, and preambleTransMax configured in the beamFailureRecoveryConfig;

2> if powerRampingStepHighPriority is configured in the beamFailureRecoveryConfig:

3> set PREAMBLE_POWER_RAMPING_STEP to the powerRampingStepHighPriority.

2> else:

3> set PREAMBLE_POWER_RAMPING_STEP to powerRampingStep.

2> if scalingFactorBI is configured in the beamFailureRecoveryConfig:

3> set SCALING_FACTOR_BI to the scalingFactorBI.

1> else if the Random Access procedure was initiated for handover; and

1> if rach-ConfigDedicated is configured for the selected carrier:

2> if powerRampingStepHighPriority is configured in the rach-ConfigDedicated:

3> set PREAMBLE_POWER_RAMPING_STEP to the powerRampingStepHighPriority.

2> if scalingFactorBI is configured in the rach-ConfigDedicated:

3> set SCALING_FACTOR_BI to the scalingFactorBI.

1> perform the Random Access Resource selection procedure (see clause 5.1.2).

5.1.2 Random Access Resource Selection

The MAC entity shall:

1> if the Random Access procedure was initiated for beam failure recovery (as specified in clause 5.17); and 1> if the beamFailureRecoveryTimer (in clause 5.17) is either running or not configured; and 1> if the contention-free Random Access Resources for beam failure recovery request associated with any of the SSBs and/or CSI-RSs have been explicitly provided by RRC; and 1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:

2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;

2> if CSI-RS is selected, and there is no ra-PreambleIndex associated with the selected CSI-RS:

3> set the PREAMBLE_INDEX to a ra-PreambleIndex corresponding to the SSB in candidateBeamRSList which is quasi-colocated with the selected CSI-RS as specified in TS 38.214 [7].

2> else:

3> set the PREAMBLE_INDEX to a ra-PreambleIndex corresponding to the selected SSB or CSI-RS from the set of Random Access Preambles for beam failure recovery request.

1> else if the ra-PreambleIndex has been explicitly provided by PDCCH; and

1> if the ra-PreambleIndex is not 0b000000:

2> set the PREAMBLE_INDEX to the signalled ra-PreambleIndex;

2> select the SSB signalled by PDCCH.

1> else if the contention-free Random Access Resources associated with SSBs have been explicitly provided in rach-ConfigDedicated and at least one SSB with SS-RSRP above rsrp-ThresholdSSB amongst the associated SSBs is available:

2> select an SSB with SS-RSRP above rsrp-ThresholdSSB amongst the associated SSBs;

2> set the PREAMBLE_INDEX to a ra-PreambleIndex corresponding to the selected SSB.

1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:

2> select a CSI-RS with CSI-RSRP above rsrp-ThresholdCSI-RS amongst the associated CSI-RSS;

2> set the PREAMBLE_INDEX to a ra-PreambleIndex corresponding to the selected CSI-RS.

1> else if the Random Access procedure was initiated for SI request (as specified in TS 38.331 [5]); and 1> if the Random Access Resources for SI request have been explicitly provided by RRC:

2> if at least one of the SSBs with SS-RSRP above rsrp-ThresholdSSB is available:

3> select an SSB with SS-RSRP above rsrp-ThresholdSSB.

2> else:

3> select any SSB.

2> select a Random Access Preamble corresponding to the selected SSB, from the Random Access Preamble(s) determined according to ra-PreambleStartIndex as specified in TS 38.331 [5];

2> set the PREAMBLE_INDEX to selected Random Access Preamble.

1> else (i.e. for the contention-based Random Access preamble selection):

2> if at least one of the SSBs with SS-RSRP above rsrp-ThresholdSSB is available:

3> select an SSB with SS-RSRP above rsrp-ThresholdSSB.

2> else:

3> select any SSB.

2> if Msg3 has not yet been transmitted:

3> if Random Access Preambles group B is configured:

4> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)-preambleReceivedTargetPower-msg3-DeltaPreamble-messagePowerOffsetGroupB; or 4> if the Random Access procedure was initiated for the CCCH logical channel and the CCCH SDU size plus MAC subheader is greater than ra-Msg3SizeGroupA:

5> select the Random Access Preambles group B.

4> else:

5> select the Random Access Preambles group A.

3> else:

4> select the Random Access Preambles group A.

2> else (i.e. Msg3 is being retransmitted):

3> select the same group of Random Access Preambles as was used for the Random Access Preamble transmission attempt corresponding to the first transmission of Msg3.

2> select a Random Access Preamble randomly with equal probability from the Random Access Preambles associated with the selected SSB and the selected Random Access Preambles group.

2> set the PREAMBLE_INDEX to the selected Random Access Preamble.

1> if the Random Access procedure was initiated for SI request (as specified in TS 38.331 [5]); and 1> if ra-AssociationPeriodIndex and si-RequestPeriod are configured:

2> determine the next available PRACH occasion from the PRACH occasions corresponding to the selected SSB in the association period given by ra-AssociationPeriodIndex in the si-RequestPeriod permitted by the restrictions given by the ra-ssb-OccasionMaskIndex if configured (the MAC entity shall select a PRACH occasion randomly with equal probability amongst the consecutive PRACH occasions according to clause 8.1 of TS 38.213 [6] corresponding to the selected SSB).

1> else if an SSB is selected above:

2> determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to clause 8.1 of TS 38.213 [6], corresponding to the selected SSB; the MAC entity may take into account the possible occurrence of measurement gaps when determining the next available PRACH occasion corresponding to the selected SSB).

1> else if a CSI-RS is selected above:

2> if there is no contention-free Random Access Resource associated with the selected CSI-RS:

3> determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in TS 38.214 [7] (the MAC entity shall select a PRACH occasion randomly with equal probability amongst the consecutive PRACH occasions according to clause 8.1 of TS 38.213 [6], corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).

2> else:

3> determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).

1> perform the Random Access Preamble transmission procedure (see clause 5.1.3).

NOTE: When the UE determines if there is an SSB with SS-RSRP above rsrp-ThresholdSSB or a CSI-RS with CSI-RSRP above rsrp-ThresholdCSI-RS, the UE uses the latest unfiltered L1-RSRP measurement.

5.1.3 Random Access Preamble Transmission

The MAC entity shall, for each Random Access Preamble:

1> if PREAMBLE_TRANSMISSION_COUNTER is greater than one; and

1> if the notification of suspending power ramping counter has not been received from lower layers; and 1> if SSB or CSI-RS selected is not changed from the selection in the last Random Access Preamble transmission:

2> increment PREAMBLE_POWER_RAMPING_COUNTER by 1.

1> select the value of DELTA_PREAMBLE according to clause 7.3;

1> set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP;

1> except for contention-free Random Access Preamble for beam failure recovery request, compute the RA-RNTI associated with the PRACH occasion in which the Random Access Preamble is transmitted;

1> instruct the physical layer to transmit the Random Access Preamble using the selected PRACH occasion, corresponding RA-RNTI (if available), PREAMBLE_INDEX and PREAMBLE_RECEIVED_TARGET_POWER.

The RA-RNTI associated with the PRACH occasion in which the Random Access Preamble is transmitted, is computed as:

$$RA\text{-}RNTI = 1 + s\_id + 14 \times t\_id + 14 \times 80 \times f\_id + 14 \times 80 \times 8 \times ul\_carrier\_id$$

where s_id is the index of the first OFDM symbol of the PRACH occasion ($0 \leq s\_id < 14$), t_id is the index of the first slot of the PRACH occasion in a system frame ($0 \leq t\_id < 80$), where the subcarrier spacing to determine t_id is based on the value of u specified in clause 5.3.2 in TS 38.211 [8], f_id is the index of the PRACH occasion in the frequency domain ($0 \leq f\_id < 8$), and ul_carrier_id is the UL carrier used for Random Access Preamble transmission (0 for NUL carrier, and 1 for SUL carrier).

5.1.4 Random Access Response Reception

Once the Random Access Preamble is transmitted and regardless of the possible occurrence of a measurement gap, the MAC entity shall:

1> if the contention-free Random Access Preamble for beam failure recovery request was transmitted by the MAC entity:

2> start the ra-Response Window configured in BeamFailureRecoveryConfig at the first PDCCH occasion as specified in TS 38.213 [6] from the end of the Random Access Preamble transmission;

2> monitor for a PDCCH transmission on the search space indicated by recoverySearchSpaceId of the SpCell identified by the C-RNTI while ra-ResponseWindow is running.

1> else:

2> start the ra-ResponseWindow configured in RACH-ConfigCommon at the first PDCCH occasion as specified in TS 38.213 [6] from the end of the Random Access Preamble transmission;

2> monitor the PDCCH of the SpCell for Random Access Response(s) identified by the RA-RNTI while the ra-ResponseWindow is running.

1> if notification of a reception of a PDCCH transmission on the search space indicated by recoverySearchSpaceId is received from lower layers on the Serving Cell where the preamble was transmitted; and 1> if PDCCH transmission is addressed to the C-RNTI; and 1> if the contention-free Random Access Preamble for beam failure recovery request was transmitted by the MAC entity:

2> consider the Random Access procedure successfully completed.

1> else if a downlink assignment has been received on the PDCCH for the RA-RNTI and the received TB is successfully decoded:

2> if the Random Access Response contains a MAC subPDU with Backoff Indicator:

3> set the PREAMBLE_BACKOFF to value of the BI field of the MAC subPDU using Table 7.2-1, multiplied with SCALING_FACTOR_BI.

2> else:

3> set the PREAMBLE_BACKOFF to 0 ms.

2> if the Random Access Response contains a MAC subPDU with Random Access Preamble identifier corresponding to the transmitted PREAMBLE_IN-DEX (see clause 5.1.3):

3> consider this Random Access Response reception successful.

2> if the Random Access Response reception is considered successful:

3> if the Random Access Response includes a MAC subPDU with RAPID only:

4> consider this Random Access procedure successfully completed;

4> indicate the reception of an acknowledgement for SI request to upper layers.

3> else:

4> apply the following actions for the Serving Cell where the Random Access Preamble was transmitted:

5> process the received Timing Advance Command (see clause 5.2);

5> indicate the preambleReceivedTargetPower and the amount of power ramping applied to the latest Random Access Preamble transmission to lower layers (i.e. (PREAMBLE_POWER_RAMPING_COUNTER−1)×PRE-AMBLE_POWER_RAMPING_STEP);

5> if the Serving Cell for the Random Access procedure is SRS-only SCell:

6> ignore the received UL grant.

5> else:

6> process the received UL grant value and indicate it to the lower layers.

4> if the Random Access Preamble was not selected by the MAC entity among the contention-based Random Access Preamble(s):

5> consider the Random Access procedure successfully completed.

4> else:

5> set the TEMPORARY_C-RNTI to the value received in the Random Access Response;

5> if this is the first successfully received Random Access Response within this Random Access procedure:

6> if the transmission is not being made for the CCCH logical channel:

7> indicate to the Multiplexing and assembly entity to include a C-RNTI MAC CE in the subsequent uplink transmission.

6> obtain the MAC PDU to transmit from the Multiplexing and assembly entity and store it in the Msg3 buffer.

NOTE: If within a Random Access procedure, an uplink grant provided in the Random Access Response for the same group of contention-based Random Access Preambles has a different size than the first uplink grant allocated during that Random Access procedure, the UE behavior is not defined.

1> if ra-ResponseWindow configured in BeamFailureRecoveryConfig expires and if a PDCCH transmission on the search space indicated by recoverySearchSpaceId addressed to the C-RNTI has not been received on the Serving Cell where the preamble was transmitted; or 1> if ra-ResponseWindow configured in RACH-ConfigCommon expires, and if the Random Access Response containing Random Access Preamble identifiers that matches the transmitted PREAMBLE_INDEX has not been received:

2> consider the Random Access Response reception not successful;

2> increment PREAMBLE_TRANSMISSION_COUNTER by 1;

2> if PREAMBLE_TRANSMISSION_COUNTER=preambleTransMax+1:

3> if the Random Access Preamble is transmitted on the SpCell: 4> indicate a Random Access problem to upper layers;

4> if this Random Access procedure was triggered for SI request:

5> consider the Random Access procedure unsuccessfully completed.

3> else if the Random Access Preamble is transmitted on an SCell:

4> consider the Random Access procedure unsuccessfully completed.

2> if the Random Access procedure is not completed:

3> select a random backoff time according to a uniform distribution between 0 and the PRE-AMBLE_BACKOFF;

3> if the criteria (as defined in clause 5.1.2) to select contention-free Random Access Resources is met during the backoff time:

4> perform the Random Access Resource selection procedure (see clause 5.1.2);

3> else:

4> perform the Random Access Resource selection procedure (see clause 5.1.2) after the backoff time.

The MAC entity may stop ra-ResponseWindow (and hence monitoring for Random Access Response(s)) after successful reception of a Random Access Response containing Random Access Preamble identifiers that matches the transmitted PREAMBLE_INDEX.

HARQ operation is not applicable to the Random Access Response reception.

5.1.5 Contention Resolution

Once Msg3 is transmitted, the MAC entity shall:

1> start the ra-ContentionResolutionTimer and restart the ra-ContentionResolutionTimer at each HARQ retransmission in the first symbol after the end of the Msg3 transmission;

1> monitor the PDCCH while the ra-ContentionResolutionTimer is running regardless of the possible occurrence of a measurement gap;

1> if notification of a reception of a PDCCH transmission of the SpCell is received from lower layers:

2> if the C-RNTI MAC CE was included in Msg3:

3> if the Random Access procedure was initiated for beam failure recovery (as specified in clause 5.17) and the PDCCH transmission is addressed to the C-RNTI; or 3> if the Random Access procedure was initiated by a PDCCH order and the PDCCH transmission is addressed to the C-RNTI; or 3> if the Random Access procedure was initiated by the MAC sublayer itself or by the RRC sublayer and the PDCCH transmission is addressed to the C-RNTI and contains a UL grant for a new transmission:

4> consider this Contention Resolution successful;

4> stop ra-ContentionResolutionTimer;

4> discard the TEMPORARY_C-RNTI;

4> consider this Random Access procedure successfully completed.

2> else if the CCCH SDU was included in Msg3 and the PDCCH transmission is addressed to its TEMPORARY_C-RNTI:

3> if the MAC PDU is successfully decoded:

4> stop ra-ContentionResolutionTimer;

4> if the MAC PDU contains a UE Contention Resolution Identity MAC CE; and

4> if the UE Contention Resolution Identity in the MAC CE matches the CCCH SDU transmitted in Msg3:

5> consider this Contention Resolution successful and finish the disassembly and demultiplexing of the MAC PDU;

5> if this Random Access procedure was initiated for SI request:

6> indicate the reception of an acknowledgement for SI request to upper layers.

5> else:

6> set the C-RNTI to the value of the TEMPORARY_C-RNTI;

5> discard the TEMPORARY_C-RNTI;

5> consider this Random Access procedure successfully completed. 4> else:

5> discard the TEMPORARY_C-RNTI;

5> consider this Contention Resolution not successful and discard the successfully decoded MAC PDU.

1> if ra-ContentionResolutionTimer expires:

2> discard the TEMPORARY_C-RNTI;

2> consider the Contention Resolution not successful.

1> if the Contention Resolution is considered not successful:

2> flush the HARQ buffer used for transmission of the MAC PDU in the Msg3 buffer;

2> increment PREAMBLE_TRANSMISSION_COUNTER by 1; 2> if PREAMBLE_TRANSMISSION_COUNTER= preambleTransMax+1:

3> indicate a Random Access problem to upper layers.

3> if this Random Access procedure was triggered for SI request:

4> consider the Random Access procedure unsuccessfully completed.

2> if the Random Access procedure is not completed:

3> select a random backoff time according to a uniform distribution between 0 and the PRE-AMBLE_BACKOFF;

3> if the criteria (as defined in clause 5.1.2) to select contention-free Random Access Resources is met during the backoff time:

4> perform the Random Access Resource selection procedure (see clause 5.1.2);

3> else:

4> perform the Random Access Resource selection procedure (see clause 5.1.2) after the backoff time.

5.1.6 Completion of the Random Access Procedure

Upon completion of the Random Access procedure, the MAC entity shall:

1> discard explicitly signalled contention-free Random Access Resources except contention-free Random Access Resources for beam failure recovery request, if any;

1> flush the HARQ buffer used for transmission of the MAC PDU in the Msg3 buffer.

5.2 Maintenance of Uplink Time Alignment

RRC configures the following parameters for the maintenance of UL time alignment:

timeAlignmentTimer (per TAG) which controls how long the MAC entity considers the Serving Cells belonging to the associated TAG to be uplink time aligned.

The MAC entity shall:

1> when a Timing Advance Command MAC CE is received, and if an $N_{TA}$ (as defined in TS 38.211 [8]) has been maintained with the indicated TAG:

2> apply the Timing Advance Command for the indicated TAG;

2> start or restart the timeAlignmentTimer associated with the indicated TAG.

1> when a Timing Advance Command is received in a Random Access Response message for a Serving Cell belonging to a TAG:

2> if the Random Access Preamble was not selected by the MAC entity among the contention-based Random Access Preamble:

3> apply the Timing Advance Command for this TAG;

3> start or restart the timeAlignmentTimer associated with this TAG.

2> else if the timeAlignmentTimer associated with this TAG is not running:

3> apply the Timing Advance Command for this TAG;

3> start the timeAlignmentTimer associated with this TAG;

3> when the Contention Resolution is considered not successful as described in clause 5.1.5; or 3> when the Contention Resolution is considered successful for SI request as described in clause 5.1.5, after transmitting HARQ feedback for MAC PDU including UE Contention Resolution Identity MAC CE:

4> stop timeAlignmentTimer associated with this TAG.

2> else:
3> ignore the received Timing Advance Command.
1> when a timeAlignmentTimer expires:
2> if the timeAlignmentTimer is associated with the PTAG:
3> flush all HARQ buffers for all Serving Cells;
3> notify RRC to release PUCCH for all Serving Cells, if configured;
3> notify RRC to release SRS for all Serving Cells, if configured;
3> clear any configured downlink assignments and configured uplink grants;
3> clear any PUSCH resource for semi-persistent CSI reporting;
3> consider all running timeAlignmentTimers as expired;
3> maintain $N_{TA}$ (defined in TS 38.211 [8]) of all TAGS.
2> else if the timeAlignmentTimer is associated with an STAG, then for all Serving Cells belonging to this TAG:
3> flush all HARQ buffers;
3> notify RRC to release PUCCH, if configured;
3> notify RRC to release SRS, if configured;
3> clear any configured downlink assignments and configured uplink grants;
3> clear any PUSCH resource for semi-persistent CSI reporting;
3> maintain $N_{TA}$ (defined in TS 38.211 [8]) of this TAG.

When the MAC entity stops uplink transmissions for an SCell due to the fact that the maximum uplink transmission timing difference between TAGs of the MAC entity or the maximum uplink transmission timing difference between TAGs of any MAC entity of the UE is exceeded, the MAC entity considers the timeAlignmentTimer associated with the SCell as expired.

The MAC entity shall not perform any uplink transmission on a Serving Cell except the Random Access Preamble transmission when the timeAlignmentTimer associated with the TAG to which this Serving Cell belongs is not running. Furthermore, when the timeAlignmentTimer associated with the PTAG is not running, the MAC entity shall not perform any uplink transmission on any Serving Cell except the Random Access Preamble transmission on the SpCell.

[ . . . ]

6.1.5 MAC PDU (Random Access Response)

A MAC PDU consists of one or more MAC subPDUs and optionally padding. Each MAC subPDU consists one of the following:
a MAC subheader with Backoff Indicator only;
a MAC subheader with RAPID only (i.e. acknowledgment for SI request);
a MAC subheader with RAPID and MAC RAR.

A MAC subheader with Backoff Indicator consists of five header fields E/T/R/R/BI as described in FIG. 6.1.5-1. A MAC subPDU with Backoff Indicator only is placed at the beginning of the MAC PDU, if included. 'MAC subPDU(s) with RAPID only' and 'MAC subPDU(s) with RAPID and MAC RAR' can be placed anywhere between MAC subPDU with Backoff Indicator only (if any) and padding (if any).

A MAC subheader with RAPID consists of three header fields E/T/RAPID as described in FIG. 6.1.5-2.

Padding is placed at the end of the MAC PDU if present. Presence and length of padding is implicit based on TB size, size of MAC subPDU(s).

Figure 16:
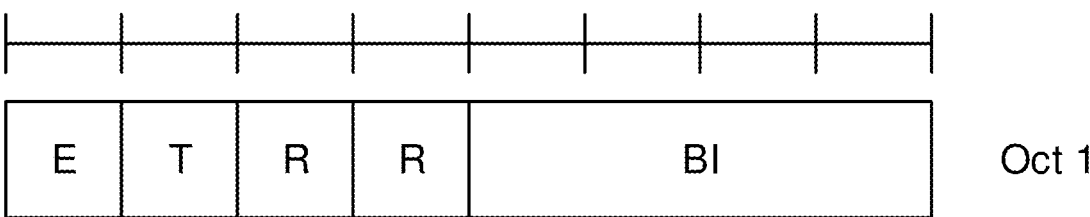
FIG. 16 is a reproduction of FIG. 6.1.5-1 of 3GPP TS 38.321 V15.7.0.
Figure 17:
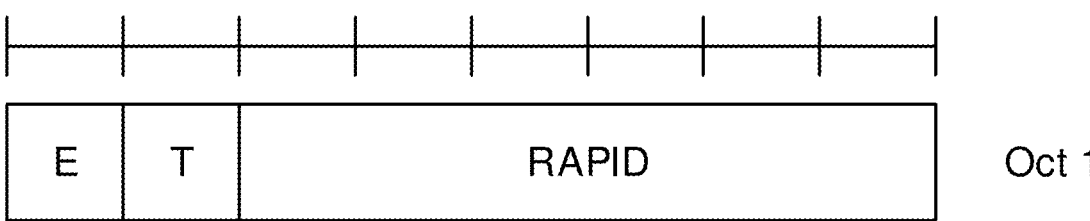
FIG. 17 is a reproduction of FIG. 6.1.5-2 of 3GPP TS 38.321 V15.7.0.
Figure 18:
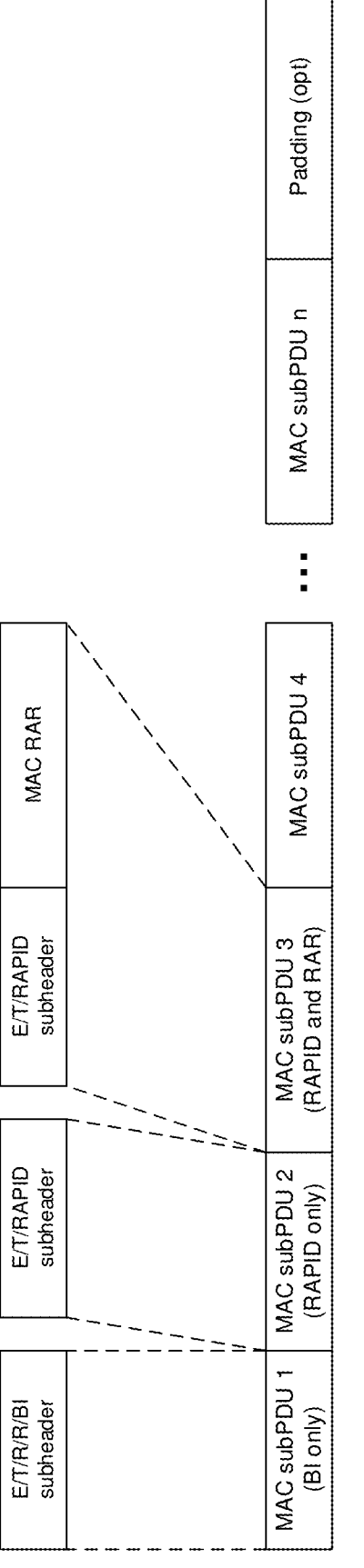
FIG. 18 is a reproduction of FIG. 6.1.5-3 of 3GPP TS 38.321 V15.7.0.

[FIG. 6.1.5-1 of 3GPP TS 38.321 V15.7.0, Entitled "E/T/R/R/BI MAC Subheader", is Reproduced as FIG. 16]
[FIG. 6.1.5-2 of 3GPP TS 38.321 V15.7.0, Entitled "E/T/RAPID MAC Subheader", is Reproduced as FIG. 17]
[FIG. 6.1.5-3 of 3GPP TS 38.321 V15.7.0, Entitled "Example of MAC PDU Consisting of MAC RARs", is Reproduced as FIG. 18]

Satellite communication, also known as non-terrestrial network (NTN), has drawn attention as a candidate for providing mobile services. At least for area where convention base station is not deployed, e.g. polar area, desert region, high mountain or on airplane, NTN could be utilized to provide mobile services. Even in area with convention base station coverage, NTN could potentially be used as complementary service provider, e.g. for some type of services. High altitude platform station (HAPS), such as drone, unmanned aircraft, or balloon, could be considered as a category or type of NTN, e.g. with a smaller distance from earth. There are several type of NTN platform under consideration, as shown in Table 4.1-1 of 3GPP TS 38.821 V0.7.0.

[Table 4.1-1 of 3GPP TS 38.821 V0.7.0, Entitled "Types of NTN Platforms", is Reproduced as FIG. 19]

In Table 4.1-1 of 3GPP TS 38.821 V0.7.0, UAS stands for "unmanned aircraft system".

Different types of platforms may have different characteristics or different applicability. For example, the altitude, shape of orbit, mobility with respect to an earth point could be different. For GEO, the altitude is quite high which would result in higher pathloss as well as higher propagation delay or round trip delay. GEO could enjoy the benefit of stationary with respect to an earth point, and could provide coverage for most places around the earth. For LEO, the altitude is relative short and thus the loss and delay are less comparing with GEO. LEO would move around the earth, with respect to an earth point, so that it could cover some area which would be difficult to cover by GEO, such as polar area. However, the speed of movement is very high so that such mobility creates another issue, e.g. satellites covering a certain area would change from time to time with high speed. It is different from convention base station with fixed or almost fixed location. High roundtrip delay and higher base station mobility are major different factors comparing with convention mobile network. The issues induced by the factor need to be solved to make mobile service support via NTN possible.

In the RAN #98 meeting and the RAN #98bis meeting, there were some discussions regarding how to acquire TA under NTN scenario. Some relevant discussions are captured in 3GPP R1-191149 and R1-193275 as follows:

Agreement:

Following options can be considered to support TA adjustment for UL transmission:

Option 1
Autonomous acquisition of the TA at UE with known location and satellite ephemeris:
FFS: how to compensate the $T_A$, e.g., full TA or only UE-specific differential $T_A$.
Note: If only UE-specific differential TA is compensated, timing offset between gNB DL and UL frame should be managed by network and acquisition of common TA is needed.
FFS: additional TA signalling from BS considering the potential inaccuracy.

Option 2

Indication of common TA to all users within the coverage of the same beam with broadcasting as a baseline for signalling, e.g., via SIB/MIB FFS: additional UE-specific differential TA signalling from BS.

FFS: the reference point(s) for common TA calculation.

Additional enhancements to existing TA signaling in Rel-15 can be considered for TA maintenance Parameters indicated by gNB to enable the TA adjustment Cell/UE-group specific signalling Agreement:

W.r.t the Option 1 of a previous agreement on TA adjustment for UL transmission, the following alternatives can be considered:

Alt-1: Compensation of the full-TA is conducted at the UE.

Note: Full-TA includes impact due to service link.

FFS: impact of feeder link.

Alt-2: Compensation of UE specific differential TA only is conducted at the UE.

FFS: The reference point(s) for UE specific differential TA calculation

Agreement:

W.r.t the Option 2 of TA adjustment from a previous agreement for UL transmission in NTN, Single reference point per beam for common TA calculation is considered as the baseline.

FFS: Multiple reference points per beam for common TA calculation.

In addition to the signalling of the common TA, Rel-15 signaling for UE-specific differential TA indication from BS can be considered Extension of range (explicit or implicit) for TA indication in RAR can be considered.

FFS: Negative values of TA

In conventional system, Uplink (UL) transmission timing is acquired based on relative timing. In other words, UL transmission timing is derived based on (or relative to) a Downlink (DL) reception timing. For NTN, one-way propagation delay or the RTT could be quite large, e.g. up to hundreds of ms, since a distance between base station (e.g. satellite) could be quite large (e.g. 300~36,000 km). Therefore, the latency of obtaining Timing Advance (TA) could be larger than conventional system. As discussed above, one or two round trip(s) is required to obtain an initial TA value or to update TA value, e.g. via random access procedure or a TA command Medium Access Control (MAC) Control Element (CE). Another factor to introduce delay is DL synchronization procedure. As discussed above, Synchronization Signal Block (SSB) periodicity is selected by a base station. The value could be up to 160 ms. A 160 ms SSB periodicity corresponds to an average of ~80 ms DL synchronization acquisition delay (e.g. for the case UE has not obtained DL synchronization). In summary, a relative timing based UL timing determination would induce delay comprising UL TA obtaining delay and/or DL sync delay.

A first general concept of this invention is that a UE determines UL transmission timing of an UL signal based on absolute time. The absolute time is based on a clock of the UE. The absolute time may not be derived from a DL reception timing. The absolute time may comprise hour, minute, second, millisecond, microsecond, and/or nanosecond. The UE could determine a timing UL transmission begins or starts based on absolute time. The UE could also determine an UL subframe begins or starts based on absolute time. Furthermore, the UE could determine an UL slot begins or starts based on absolute time. An UL transmission could begin or start at the absolute time. An UL slot could begin or start at the absolute time. An UL subframe could begin or start at the absolute time. The UE could determine a timing advance based on absolute time.

In one embodiment, the absolute time could be an UL reception time of the signal at the base station. The absolute time could be derived based on an UL reception time of the signal at the base station, or based on an UL reception time at the base station a propagation delay between the UE and a base station. Alternatively, the absolute timing could be a beginning or start of UL subframe at the base station. The absolute time could be derived based on a beginning or start of UL subframe at the base station, or based on a beginning or start of UL subframe at the base station and a propagation delay between the UE and a base station. Alternatively, the absolute time could be a beginning or start of UL slot at the base station. The absolute time could be derived based on a beginning or start of UL slot at the base station, based on a beginning or start of UL slot at the base station and a propagation delay between the UE and a base station, or based on a propagation delay between the UE and a base station.

Assuming a beginning of UL subframe or UL slot at base station is X (absolute time, e.g. 14:53:21.235000) and a propagation delay between the UE and a base station is Y (e.g. 2.67 ms), the absolute time could be X-Y (e.g. 14:53:18.565000). A beginning of UL subframe or UL slot at the UE side could be set to X-Y. A UE could determine a beginning of UL subframe or UL slot based on an absolute time and a propagation delay between the UE and a base station.

Assuming a beginning of UL reception time of a UL signal at base station is X (absolute time, e.g. 14:53:21.235000) and a propagation delay between the UE and a base station is Y (e.g. 2.67 ms), the absolute time could be X-Y (e.g. 14:53:18.565000). A beginning of UL transmission time of the UL signal at the UE side could be set to X-Y. A UE could determine UL transmission timing of an UL signal based on an absolute time and a propagation delay between the UE and a base station.

The absolute timing could be fixed in the standard. The absolute time could be derived based on indication from a base station (or from another base station). Alternatively, the absolute time could be beginning or start of a DL subframe or a DL slot at the base station. The absolute time could be derived based on beginning or start of a DL subframe or a DL slot at the base station. The absolute time could be derived based on a timing difference between UL timing and DL timing at the base station. The absolute time could be derived based on a timing difference between (a boundary of) UL subframe and (a boundary of) DL subframe at the base station. The absolute timing could be stored by the UE. The absolute time could be derived from a procedure(s), e.g. a DL synchronization procedure and/or a random access procedure, during a previous attempt to access a cell.

For example, the absolute time is 14:53:21.235000, where 14 corresponds to hour. 53 corresponds to minute, and 21.235000 corresponds to second. An UL transmission or an UL subframe or an UL slot starts or begins at 14:53:21.235000.

As another example, the absolute time is 0.235000 sec. An UL transmission or an UL subframe or an UL slot starts or begins at 14:53:21.235000, 14:53:22.235000 and so on.

As another example, the absolute time is 0.235000 sec. An UL transmission or an UL subframe or an UL slot starts or begins at 14:53:21.235000, 14:53:22.235000, . . . .

As another example, the absolute time is X.XXX000 sec., where each X represents a decimal digit corresponding to an integer between 0 and 9. An UL transmission or an UL subframe or an UL slot starts or begins at 14:53:21.235000, 14:53:22.236000, 14:53:22.237000, . . . .

As another example, the absolute time is 000 nanosecond. An UL transmission or an UL subframe or an UL slot starts or begins at 14:53:21.235000, 14:53:22.236000, 14:53:22.237000, . . . .

Throughout the application, the method could be used under some cases (e.g. (up-to-date) GPS information (such as location and/or satellite ephemeris) is available and/or UE's clock is precise and/or the absolute time could be derived and/or the UE is in connected mode and/or the UE has performed random access procedure (in the cell)). Conventional method to obtain UL transmission timing (e.g. based on $T_A$ or relative timing) could be used for other cases, (e.g. (up-to-date) GPS information (such as location and/or satellite ephemeris) is not available and/or UE's clock is not precise and/or the absolute time could not be derived and/or the UE is in idle mode and/or the UE has not performed random access procedure (in the cell)).

A second general concept is part of a procedure for timing synchronization is performed based on absolute time. Another part of the procedure for timing synchronization is performed based on relative time. For example, DL synchronization could be performed based on absolute time. The random access procedure could be performed based on relative time. A UE could determine DL reception timing based on absolute time, based on its clock, based a DL transmission time at a base station, based on a propagation delay between a base station and the UE, or based a DL transmission time at a base station and a propagation delay between a base station and the UE. The DL transmission timing at the base station is in absolute time.

The DL transmission timing at the base station could be indicated by the base station (or another base station). The DL transmission timing at the base station could be stored by the UE. The DL transmission timing at the base station could be derived from a procedure(s), e.g. a DL synchronization procedure and/or a random access procedure, during a previous attempt to access a cell.

A UE could determine (boundary of) DL subframe or DL slot based on absolute timing, based on its clock, based a (boundary of) DL subframe or DL slot at a base station, based on a propagation delay between a base station and the UE, based a (boundary of) DL subframe or DL slot at a base station and a propagation delay between a base station and the UE. The (boundary of) DL subframe or DL slot at the base station could be in absolute time. The (boundary of) DL subframe or DL slot at the base station could be indicated by the base station (or another base station). A (boundary of) DL subframe or DL slot at the base station could be stored by the UE. A (boundary of) DL subframe or DL slot at the base station could be derived from a procedure(s), e.g. a DL synchronization procedure and/or a random access procedure, during a previous attempt to access a cell.

The UE could directly derive (boundary) DL subframe or DL slot based on the determined DL reception timing before acquiring SSB or without acquiring SSB or when the UE does not synchronized with the cell. The UE could directly send a preamble to the base station based on the determined DL reception timing before acquiring SSB or without acquiring SSB or when the UE does not synchronized with the cell. The UE could directly send PRACH without waiting for SSB.

A UE could determine which cell to access (e.g. to transmit preamble) base on its GPS information (e.g. location and/or satellite ephemeris). A UE could determine which beam to access (e.g. to select PRACH resource) base on its GPS information (e.g. location and/or satellite ephemeris). A UE could determine a propagation delay between a base station and the UE based on its GPS information (e.g. location and/or satellite ephemeris).

A UE could adjust its clock based on its GPS information (e.g. location and/or satellite ephemeris and/or GPS time). For example, the UE could acquire GPS time from 4 satellites. The UE could derive a timing error of its clock based on the 4 satellites. Three (3) satellites could be used to obtain UE's location on earth assuming UE's clock is very precise. The 4th satellite could be used to derive the timing error. After compensate the timing error, UE's clock is precise.

If the UE's location is (x, y, z) and its clock has a timing error $\Delta$, the following propagation delays could be derived as follows:

Satellite $S_1$ Location is $(x_1, y_1, z_1)$ and a time stamp $t_1$ is received at $t_1'$, propagation delay between UE and $S_1$ is $t_1' + \Delta - t_1$.

Satellite $S_2$ Location is $(x_2, y_2, z_2)$ and a time stamp $t_2$ is received at $t_2'$, propagation delay between UE and $S_2$ is $t_2' + \Delta - t_2$.

Satellite $S_1$ Location is $(x_1, y_1, z_1)$ and a time stamp $t_3$ is received at $t_3'$, propagation delay between UE and $S_3$ is $t_3' + \Delta - t_3$.

Satellite $S_1$ Location is $(x_1, y_1, z_1)$ and a time stamp $t_4$ is received at $t_4'$, propagation delay between UE and $S_4$ is $t_4' + \Delta - t_4$.

The UE could derive 4 equations as follows:

$$(x-x_1)^2+(y-y_1)^2+(z-z_1)^2=(3*10^{8}*(t_1'+\Delta-t_1))^2 \qquad 1.$$

$$(x-x_2)^2+(y-y_2)^2+(z-z_2)^2=(3*10^{8}*(t_2'+\Delta-t_2))^2 \qquad 2.$$

$$(x-x_3)^2+(y-y_3)^2+(z-z_3)^2=(3*10^{8}*(t_3'+\Delta-t_3))^2 \qquad 3.$$

$$(x-x_4)^2+(y-y_4)^2+(z-z_4)^2=(3*10^{8}*(t_4'+\Delta-t_4))^2 \qquad 4.$$

x, y, z, $\Delta$ could be derived based on the 4 equations, since others are known values. The UE could derive propagation delay based on a time stamp and a timing the UE receives the time stamp.

In one embodiment, a UE could perform UL transmission of an UL signal in an UL subframe wherein the UL subframe begin at a timing derived based on an absolute time. The absolute time could be based on a clock of the UE. The absolute time may comprise one or more of time units. A time unit could be hour, minute, second, millisecond, microsecond or nanosecond. The absolute time could be derived based on an absolute time when a UL subframe begins at a base station. The absolute time could be an absolute time when a UL subframe begins at a base station.

The absolute time could be derived based on an absolute time when a DL subframe begins at a base station. The absolute time could be an absolute time when a DL subframe begins at a base station. The absolute time could be derived based on a timing difference between DL subframe and UL subframe at the base station. The absolute time could be derived from a propagation delay between a base station and the UE. The absolute time could be derived so that an UL signal begins at the beginning of an UL subframe arrives at a base station at the beginning of UL subframe of the base station. The absolute time could be derived from an absolute time when a UL subframe begins at a base station subtracting a propagation delay between a base station and the UE. The UL subframe may begin at a timing derived from an absolute time and a propagation delay between a base station and the UE. The UL subframe may also begin at a timing derived from an absolute time subtracting a propagation delay between a base station and the UE.

The timing could be the absolute time. The timing could be based on a clock of the UE. The timing time comprises one or more of time units. A time unit could be hour, minute, second, millisecond, microsecond or nanosecond. The timing could be derived based on an absolute time when a UL subframe begins at a base station. The timing could be an absolute time when a UL subframe begins at a base station. The timing could be derived based on an absolute time when a DL subframe begins at a base station.

The timing could be an absolute time when a DL subframe begins at a base station. The timing could be derived from a timing difference between DL subframe and UL subframe at the base station. The timing could be derived from a propagation delay between a base station and the UE. The timing could be derived so that an UL signal begins at the beginning of an UL subframe arrives at a base station at the beginning of UL subframe of the base station. The timing could be derived by an absolute time when a UL subframe begins at a base station subtracting a propagation delay between a base station and the UE.

The timing may not be derived based on a beginning of a DL subframe at the UE. The timing may not be derived relative to a beginning of a DL subframe at the UE. The UE may not perform DL synchronization procedure. The timing may not be derived based on a timing advance value. The timing may not be derived based on a synchronization procedure. The timing may not be derived based on a random access procedure.

The UE may receive an indication from a base station indicating the absolute time. The UE may receive an indication from a base station indicating an absolute time when a UL subframe begins at a base station, or when a DL subframe begins at a base station. The UE may receive an indication from a base station indicating a timing difference between DL subframe and UL subframe at the base station.

The UE could derive the absolute timing based on a fixed value (e.g. in a standard), on a predefined value (e.g. in a standard), on a stored value, or on a procedure during a previous attempt to access a cell. The procedure may comprise a DL synchronization procedure and/or a random access procedure.

The UE may not have a valid timing advance value. Time alignment timer of the UE may have expired, or may have been set to infinity. The UE could perform UL transmission without a valid Timing advance value. The UL signal could be a preamble. The UL signal could be PUSCH or PUCCH. The UE may not expect to receive a MAC CE comprising TA command, or a PDCCH order.

The UE may not start or restart a time alignment timer. The UL signal could be a PUCCH for SR, a Msg A of a two-step random access procedure, or a SRS.

In another embodiment, a base station could provide a timing information to a UE. The timing information could comprise an absolute time. The timing information could be used to assist the UE to derive UL transmission timing. The timing information may correspond to when a UL subframe begins at a base station, or when a DL subframe begins at a base station. The timing information could also correspond to a timing difference between DL subframe and UL subframe at the base station.

The timing information may comprise an absolute time when a UL subframe begins at a base station, or when a DL subframe begins at a base station. The timing information may also comprise an absolute time a timing difference between DL subframe and UL subframe at the base station. The base station may not configure a time alignment timer to the UE. The base station may not send a timing advance command to the UE. The base station could receive UL signal from the UE. The UL signal could be a preamble, a PUSCH, a PUCCH, or a SRS.

In still another embodiment, a base station could receive its UL subframe beginning at a fixed or predefined timing. The base station could transmit its UL subframe beginning at a fixed or predefined timing.

In the above embodiments, the UE could skip DL synchronization and/or random access procedure before UL transmission. Any behavior described above for a UE could be symmetrically applied to a base station. For example, "a UE receives . . . " may mean "a base station transmits". Any behavior described above for a UE could be correspondingly applied to a base station. Any behavior described above described for a base station could be correspondingly applied to a UE. For example, a base station would derive a timing in a same or similar way as a UE according to above descriptions, or vice versa.

Throughout the invention, the invention describes behavior or operation of a single serving cell unless otherwise noted. Throughout the invention, the invention describes behavior or operation of multiple serving cells unless otherwise noted. Throughout the invention, the invention describes behavior or operation of a single bandwidth part unless otherwise noted. Throughout the invention, a base station configures multiple bandwidth parts to the UE unless otherwise noted. Throughout the invention, a base station configures a single bandwidth part to the UE unless otherwise noted.

Figure 20:
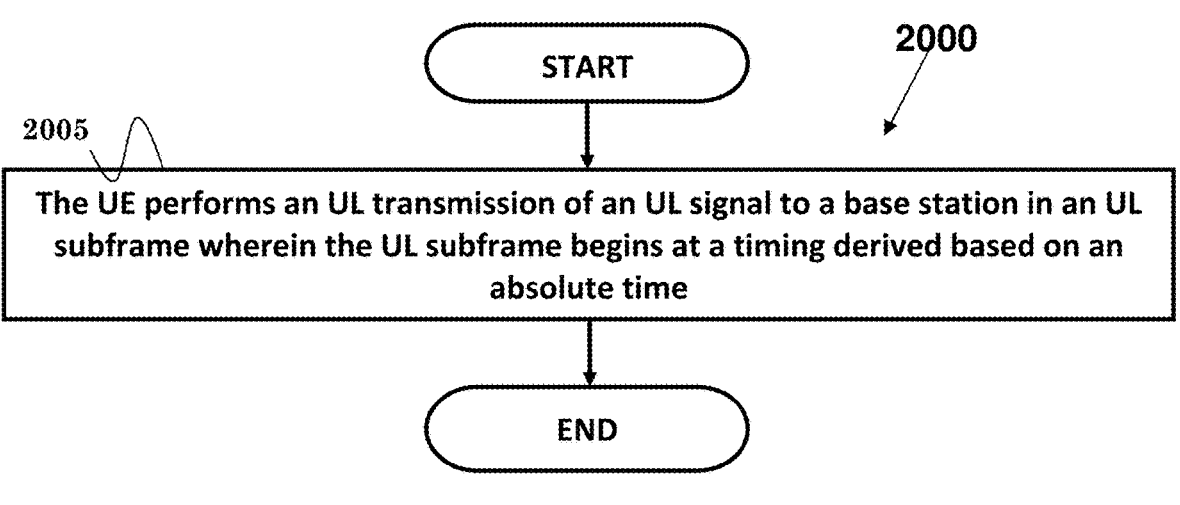
FIG. 20 is a flow chart according to one exemplary embodiment.

FIG. 20 is a flow chart 2000 according to one exemplary embodiment from the perspective of a UE. In step 2005, the UE performs an UL transmission of an UL signal to a base station in an UL subframe wherein the UL subframe begins at a timing derived based on an absolute time.

In one embodiment, the UE could receive an indication from the base station indicating the absolute time. The absolute time could be an absolute time when a DL subframe begins at a base station, or when the UL subframe begins at a base station.

In one embodiment, the UE could derive the timing based on a second absolute time which is based on a clock of the UE. The UE could derive a propagation delay based on the absolute time, or on a reception time.

In one embodiment, the reception time could be based on a clock of the UE or a Global Position System (GPS) time. The UE could derive the timing based on a propagation delay. The UE could derive the timing based on a difference between when the UL subframe begins at the base station and the propagation delay, or on a difference between UL timing and Downlink (DL) timing at the base station. The UE could derive the timing without a timing advance command from the base station.

In one embodiment, the UE could derive the timing based on the absolute time if the UE's clock is precise. However, the UE may not derive the timing based on the absolute time if the UE's clock is not precise.

In one embodiment, the absolute time could be based on a clock of the UE. The UL subframe could be an UL subframe at the UE. The absolute time may comprise one or more of time units. A time unit could be one of hour, minute, second, millisecond, microsecond or nanosecond.

In one embodiment, the absolute time could be derived based on a timing difference between DL subframe and UL subframe at the base station. The absolute time could also be derived from a propagation delay between the base station and the UE. Furthermore, the absolute time could be derived by an absolute time when a UL subframe begins at a base station subtracting a propagation delay between a base station and the UE.

In one embodiment, the timing may not be derived based on a beginning of a DL subframe at the UE. Furthermore, the timing may not be derived relative to a beginning of a DL subframe at the UE. In addition, the timing may not be derived based on a synchronization procedure, or based on a random access procedure.

Referring back to FIGS. 3 and 4, in one exemplary embodiment of a UE. The UE 300 includes a program code 312 stored in the memory 310. The CPU 308 could execute program code 312 to enable the UE to perform an UL transmission of an UL signal to a base station in an UL subframe wherein the UL subframe begins at a timing derived based on an absolute time. Furthermore, the CPU 308 can execute the program code 312 to perform all of the above-described actions and steps or others described herein.

Figure 21:
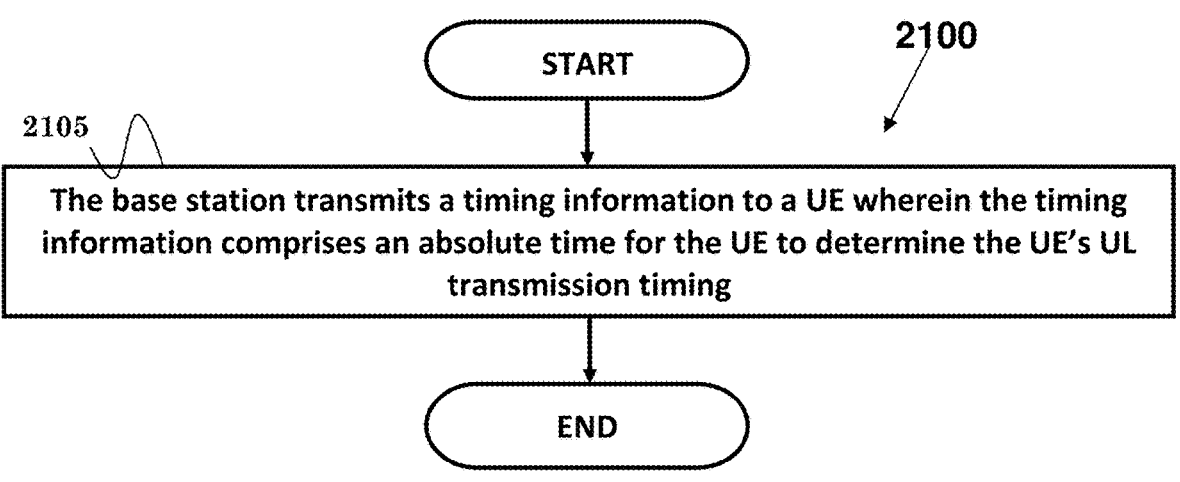
FIG. 21 is a flow chart according to one exemplary embodiment.

FIG. 21 is a flow chart 2100 according to one exemplary embodiment from the perspective of a base station. In step 2105, the base station transmits a timing information to a UE wherein the timing information comprises an absolute time for the UE to determine the UE's UL transmission timing.

In one embodiment, the absolute time may be an absolute time when a DL subframe begins at a base station, or when the UL subframe begins at a base station. The absolute time could be used for deriving a propagation delay between the base station and the UE.

In one embodiment, the base station could indicate a difference between UL timing and Downlink (DL) timing at the base station to the UE. However, the base station may not send a timing advance command to the UE for determining the UE's UL transmission timing.

Referring back to FIGS. 3 and 4, in one exemplary embodiment of a base station. The base station 300 includes a program code 312 stored in the memory 310. The CPU 308 could execute program code 312 to enable the base station to transmit a timing information to a UE wherein the timing information comprises an absolute time for the UE to determine the UE's UL transmission timing. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware; in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/ processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a User Equipment (UE), comprising:

performing, by the UE, an Uplink (UL) transmission of an UL signal to a base station in an UL subframe, wherein the UL subframe begins at a timing derived based on an absolute time, wherein the absolute time is based on a clock of the UE, with the clock of the UE based on Global Positioning System (GPS) time from at least four satellites, wherein at least three satellites of the at least four satellites are used to obtain location of the UE and a fourth satellite of the at least four satellites is used to derive a timing error, and wherein the timing error is derived from propagation delays based on time stamps and timings the UE receives from the time stamps.

2. The method of claim 1, wherein the UE receives an indication from the base station indicating the absolute time.

3. The method of claim 2, wherein the absolute time is an absolute time when a DL subframe transmission begins at a base station.

4. The method of claim 1, wherein the UE derives the timing based on a second absolute time which is based on a clock of the UE.

5. The method of claim 1, wherein the UE derives a propagation delay between the base station and the UE using the absolute time.

6. The method of claim 5, wherein the UE derives the propagation delay based on an UL reception time.

7. The method of claim 6, wherein the UL reception time is based on a GPS time.

8. The method of claim 1, wherein the UE derives the timing based on a propagation delay.

9. The method of claim 1, wherein the UE derives the timing based on a difference between UL transmission timing and DL transmission timing at the base station.

10. The method of claim 1, wherein the UE derives the timing without a timing advance command from the base station.

11. The method of claim 1, wherein the clock of the UE is precise.

12. The method of claim 1, wherein the clock of the UE is not precise.

13. A method for a base station, comprising:

transmitting, by the base station, a timing information to a User Equipment (UE), wherein the timing information comprises an absolute time for the UE to determine the Uplink (UL) transmission timing, and wherein the absolute time is based on a clock of the UE, with the clock of the UE based on Global Positioning System (GPS) time from at least four satellites, wherein at least three satellites of the at least four satellites are used to obtain location of the UE and a fourth satellite of the at least four satellites is used to derive a timing error, and wherein the timing error is derived from propagation delays based on time stamps and timings the UE receives from the time stamps.

14. The method of claim 13, wherein the absolute time is an absolute time when a DL subframe transmission begins at a base station.

15. The method of claim 13, wherein the absolute time is used for deriving a propagation delay between the base station and the UE.

16. The method of claim 13, wherein the base station indicates a difference between UL transmission timing and DL transmission timing at the base station to the UE.

17. The method of claim 13, wherein the base station does not send a timing advance command to the UE for determining the UE's UL transmission timing.

* * * * *